US008783014B2

(12) United States Patent
Itoh

(10) Patent No.: US 8,783,014 B2
(45) Date of Patent: Jul. 22, 2014

(54) CONTROL SYSTEM FOR INTERNAL COMBUSTION ENGINE

(75) Inventor: Kazuhiro Itoh, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 180 days.

(21) Appl. No.: 13/394,458

(22) PCT Filed: Sep. 10, 2009

(86) PCT No.: PCT/JP2009/065871
§ 371 (c)(1),
(2), (4) Date: Mar. 6, 2012

(87) PCT Pub. No.: WO2011/030433
PCT Pub. Date: Mar. 17, 2011

(65) Prior Publication Data
US 2012/0159934 A1 Jun. 28, 2012

(51) Int. Cl.
*F01N 3/00* (2006.01)
*F02M 25/07* (2006.01)

(52) U.S. Cl.
CPC ....... *F02M 25/0718* (2013.01); *F02M 25/0713* (2013.01); *F02M 25/0732* (2013.01); *Y02T 10/121* (2013.01); *F02M 25/0707* (2013.01); *F01N 2610/02* (2013.01); *F01N 2610/1453* (2013.01); *F02M 25/0709* (2013.01)
USPC .................. 60/278; 60/279; 60/280; 60/286; 60/301; 60/303

(58) Field of Classification Search
USPC ............ 60/278, 279, 280, 286, 297, 301, 303
See application file for complete search history.

(56) References Cited

U.S. PATENT DOCUMENTS

| 5,884,476 | A | 3/1999 | Hirota et al. | |
|---|---|---|---|---|
| 6,209,317 | B1 * | 4/2001 | Hirota | 60/297 |
| 7,681,394 | B2 * | 3/2010 | Haugen | 60/603 |
| 7,918,084 | B2 * | 4/2011 | Tahara | 60/285 |
| 8,151,558 | B2 * | 4/2012 | Robel et al. | 60/295 |
| 8,181,445 | B2 * | 5/2012 | Duvinage et al. | 60/286 |
| 8,347,609 | B2 * | 1/2013 | Hepburn et al. | 60/286 |
| 8,424,289 | B2 * | 4/2013 | Narayanaswamy et al. | 60/285 |
| 2002/0054844 | A1 | 5/2002 | Pfeifer et al. | |

(Continued)

FOREIGN PATENT DOCUMENTS

CN 101463770 A 6/2009
EP 1 138 891 A2 10/2001

(Continued)

OTHER PUBLICATIONS

International Search Report issued in Application No. PCT/JP2009/065871; Dated Nov. 17, 2009 (With Translation).

*Primary Examiner* — Binh Q Tran
(74) *Attorney, Agent, or Firm* — Oliff PLC

(57) ABSTRACT

The present invention is intended to suppress the inflow of an ammonia derived compound to an EGR passage. In the present invention, in an exhaust system, there is arranged an ammonia derived compound addition means in such a position as to enable at least a part of the ammonia derived compound added therefrom to arrive at a connection portion of the EGR passage. Further, in the present invention, the inflow of the ammonia derived compound added from the ammonia derived compound addition means into the EGR passage is suppressed by a suppression means.

10 Claims, 16 Drawing Sheets

(56) References Cited

U.S. PATENT DOCUMENTS

| | | |
|---|---|---|
| 2006/0086080 A1 | 4/2006 | Katogi et al. |
| 2009/0158710 A1 | 6/2009 | Suzuki |
| 2009/0165758 A1 | 7/2009 | Nishiumi et al. |

FOREIGN PATENT DOCUMENTS

| | | |
|---|---|---|
| JP | A-11-324661 | 11/1999 |
| JP | A-2000-297704 | 10/2000 |
| JP | A-2001-280125 | 10/2001 |
| JP | A-2002-200413 | 7/2002 |
| JP | B2-3465490 | 11/2003 |
| JP | A-2004-324630 | 11/2004 |
| JP | A-2006-125247 | 5/2006 |
| JP | A-2007-162501 | 6/2007 |
| JP | A-2008-184925 | 8/2008 |
| JP | A-2008-291671 | 12/2008 |

* cited by examiner

US 8,783,014 B2

CONTROL SYSTEM FOR INTERNAL COMBUSTION ENGINE

TECHNICAL FIELD

The present invention relates to a control system for an internal combustion engine provided with an EGR,

BACKGROUND ART

In the past, there has been known an EGR (Exhaust Gas Recirculation) system which serves to introduce an exhaust gas of an internal combustion engine into an intake system of the internal combustion engine as an EGR gas. By supplying the EGR gas to the internal combustion engine, it is possible to attain a decrease of NOx in the exhaust gas and an improvement in fuel economy.

In addition, in recent years, there have been developed internal combustion engines which are each provided with a low pressure EGR device and a high pressure EGR device. The low pressure EGR device has a low pressure EGR passage which is connected at one end thereof to a portion of an exhaust system at the downstream side of a turbine of a supercharger, and is also connected at the other end thereof to a portion of an intake system at the upstream side of a compressor of the supercharger. An EGR gas is introduced into the intake system through the low pressure EGR passage. The high pressure EGR device has a high pressure EGR passage which is connected at one end thereof to a portion of the exhaust system at the upstream side of the turbine of the supercharger, and is also connected at the other end thereof to a portion of the intake system at the downstream side of the compressor of the supercharger. An EGR gas is introduced into the intake system through the high pressure EGR passage. A low pressure EGR valve is arranged in the low pressure EGR passage, and a high pressure EGR valve is arranged in the high pressure EGR passage. The flow rates of the EGR gases in the individual EGR passages are controlled by the individual EGR valves, respectively.

In addition, an NOx selective reduction catalyst may be arranged in the exhaust system of the internal combustion engine as an exhaust gas purification catalyst. In this case, an ammonia derived compound, which is a reducing agent, is added from an ammonia derived compound addition device which is arranged in the exhaust system at the upstream side of the NOx selective reduction catalyst, so that the ammonia derived compound is supplied to the NOx selective reduction catalyst.

In a patent document 1, there is disclosed a construction in which a supply control valve for supplying an aqueous urea solution and an NOx selective reduction catalyst are arranged in an exhaust passage at the downstream side of a connection portion of a low pressure EGR passage. In such a construction, when the aqueous urea solution is supplied from the supply control valve, the pressure in the low pressure EGR passage in the surrounding of an inflow end thereof will go up to a large extent due to the evaporation of the aqueous urea solution. As a result, there will be a fear that the amount of low pressure EGR gas may increase more than a target amount. Accordingly, in the patent document 1, in order to maintain the amount of low pressure EGR gas at the target amount, the degree of opening of the low pressure EGR valve is corrected in a decreasing direction when the aqueous urea solution is supplied from the supply control valve, in comparison with the case when the aqueous urea solution is not supplied.

PRIOR ART DOCUMENTS

Patent Documents

Patent Document 1: Japanese patent application laid-open No. 2008-291671
Patent Document 2: Japanese patent application laid-open No. 2002-200413
Patent Document 3: Japanese patent application laid-open No. 2006-125247
Patent Document 4: Japanese patent application laid-open No. 2004-324630
Patent Document 5: Japanese patent No. 3465490

SUMMARY OF THE INVENTION

Problems to be Solved by the Invention

Depending on an arrangement of the ammonia derived compound addition device in the exhaust system, the ammonia derived compound added from the ammonia derived compound addition device may flow into the EGR passage. The ammonia derived compound is high in corrosiveness. For that reason, when this compound flows into the EGR passage, there will be a fear that the corrosion of component parts of the EGR system, such as an EGR valve, an EGR cooler, etc., may be facilitated. In addition, when the ammonia derived compound flows into the intake system of the internal combustion engine together with the EGR gas, there will be a fear that the corrosion of component parts of the intake system such as a compressor housing, an impeller, a throttle valve, etc., and component parts of the engine such as valve seats, piston rings, etc., may be facilitated.

The present invention has been made in view of the above-mentioned problems, and has for its object to provide a technique which is capable of suppressing an ammonia derived compound from flowing into an EGR passage in an internal combustion engine which is equipped with an EGR system and has an NOx selective reduction catalyst and an ammonia derived compound addition device arranged in an exhaust system.

Means for Solving the Problems

In the present invention, in an exhaust system, there is arranged an ammonia derived compound addition device in such a position as to enable at least a part of an ammonia derived compound added therefrom to arrive at a connection portion of an EGR passage. Then, in the present invention, the inflow of the ammonia derived compound added from the ammonia derived compound addition device into the EGR passage is suppressed by a controller.

More specifically, a control system for an internal combustion engine according to the present invention is characterized by comprising:

an EGR system that has an EGR passage connected at its one end to an exhaust system of the internal combustion engine, and at its other end to an intake system of the internal combustion engine, and serves to introduce a part of an exhaust gas flowing through the exhaust system into the intake system through the EGR passage as an EGR gas;

an NOx selective reduction catalyst that is arranged in the exhaust system;

an ammonia derived compound addition device that serves to add an ammonia derived compound, which is a reducing agent, into the exhaust gas, and is arranged in the exhaust system at the upstream side of said NOx selective reduction catalyst and in such a position as to enable at least a part of the ammonia derived compound thus added to arrive at a connection portion of said EGR passage; and at least one controller suppresses the inflow of the ammonia derived compound added from said ammonia derived compound addition device into said EGR passage.

When the ammonia derived compound added into the exhaust gas arrives at the connection portion of the EGR passage in the exhaust system, there will be a fear that the ammonia derived compound may flow into the EGR passage together with the exhaust gas. According to the present invention, however, it is possible to suppress the inflow of the ammonia derived compound into the EGR passage by the controller.

In the present invention, the controller may suppress the inflow of the ammonia derived compound added from said ammonia derived compound addition device into the EGR passage, by decreasing the flow rate of the EGR gas flowing through the EGR passage at the time when the ammonia derived compound is added from the ammonia derived compound addition device, in comparison with the case when the ammonia derived compound is not added.

When the ammonia derived compound is supplied to the NOx selective reduction catalyst, that portion of the ammonia derived compound which has not been used for the reduction of NOx in the NOx selective reduction catalyst flows out to the downstream side thereof. At this time, the amount of the ammonia derived compound flowing out to the downstream side of the NOx selective reduction catalyst is changed according to the temperature of the NOx selective reduction catalyst, the flow rate of the exhaust gas, etc.

Accordingly, in cases where the one end of the EGR passage is connected to a portion of the exhaust system at the downstream side of the NOx selective reduction catalyst, at the time when the flow rate of the EGR gas flowing through the EGR passage is decreased, the controller may make the flow rate of the EGR gas larger in cases where the amount of the ammonia derived compound flowing out to the downstream side of the NOx selective reduction catalyst without being used for the reduction of NOx in the NOx selective reduction catalyst is small, in comparison with the case where that amount of the ammonia derived compound is large.

According to this, a decrease in the amount of EGR gas supplied to the internal combustion engine can be suppressed as much as possible, while suppressing the inflow of the ammonia derived compound into the EGR passage.

In the present invention, the EGR passage may be a low pressure EGR passage. The low pressure EGR passage has one end thereof connected to a portion of the exhaust system at the downstream side of a turbine of a turbocharger, and the other end thereof connected to a portion of the intake system at the upstream side of a compressor of the turbocharger. Then, the EGR system may be further provided with a high pressure EGR passage. The high pressure EGR passage has one end thereof connected to a portion of the exhaust system at the upstream side of the turbine of the turbocharger, and the other end thereof connected to a portion of the intake system at the downstream side of the compressor of the turbocharger.

In the above case, the controller decreases the flow rate of the EGR gas flowing through the low pressure EGR passage at the time when the ammonia derived compound is added from the ammonia derived compound addition device. At this time, in cases where the circulation of the EGR gas in the low pressure EGR passage is not stopped, the flow rate of the EGR gas flowing through the high pressure EGR passage may also be decreased.

If the circulation of the EGR gas in the low pressure EGR passage is not stopped even when the flow rate of the EGR gas flowing through the low pressure EGR passage is decreased, the ammonia derived compound may flow into the low pressure EGR passage. When the ammonia derived compound flows into the low pressure EGR passage and is then supplied to the internal combustion engine together with the EGR gas, the ammonia derived compound may be discharged from the internal combustion engine to the exhaust system together with the exhaust gas. According to the above, it is possible to suppress the ammonia derived compound discharged to the exhaust system from this internal combustion engine from flowing into the high pressure EGR passage.

On the other hand, when the flow rate of the EGR gas flowing through the low pressure EGR passage is decreased, the amount of the EGR gas introduced into the intake system by way of the low pressure EGR passage (hereinafter referred to as a low pressure EGR gas) decreases. Accordingly, in the above case, at the time when the ammonia derived compound is added from the ammonia derived compound addition device, the controller may decrease the flow rate of the EGR gas flowing through the low pressure EGR passage and increase the flow rate of the EGR gas flowing through the high pressure EGR passage. By increasing the flow rate of the EGR gas flowing through the high pressure EGR passage, it is possible to increase the amount of the EGR gas introduced into the intake system by way of the high pressure EGR passage (hereinafter referred to as a high pressure EGR gas). For that reason, an amount of decrease of the low pressure EGR gas can be supplemented by the high pressure EGR gas.

In addition, in the present invention, at the time when the EGR gas is introduced into the intake system by way of the EGR passage, the &Tapp controller may suppress the inflow of the ammonia derived compound added from the ammonia derived compound addition device into the EGR passage, by making the amount of addition of the ammonia derived compound from the ammonia derived compound addition device smaller in comparison with the case when the introduction of the EGR gas into the intake system is stopped.

At this time, in cases where the one end of the EGR passage is connected to the portion of the exhaust system at the downstream side of the NOx selective reduction catalyst, at the time when the amount of addition of the ammonia derived compound from the ammonia derived compound addition device is decreased, said controller may make the amount of addition of the ammonia derived compound larger in cases where the amount of the ammonia derived compound flowing out to the downstream side of the NOx selective reduction catalyst without being used for the reduction of NOx in the NOx selective reduction catalyst is small, in comparison with the case where that amount of the ammonia derived compound is large.

According to this, a decrease in the amount of the ammonia derived compound supplied to the NOx selective reduction catalyst can be suppressed as much as possible, while suppressing the inflow of the ammonia derived compound into the EGR passage.

Here, note that in the present invention, the EGR passage may be either one of the low pressure EGR passage and the high pressure EGR passage.

Advantageous Effect of the Invention

According to the present invention, it is possible to suppress the inflow of an ammonia derived compound added into an exhaust gas into an EGR passage.

EMBODIMENTS FOR CARRYING OUT THE INVENTION

Hereinafter, specific embodiments of the present invention will be described based on the attached drawings. However, the dimensions, materials, shapes, relative arrangements and so on of component parts described in the embodiments are not intended to limit the technical scope of the present invention to these alone in particular as long as there are no specific statements.

<First Embodiment>

Reference will be made to a first embodiment of the present invention based on FIGS. 1 through 6.

(Schematic Construction of Internal Combustion Engine and Intake and Exhaust Systems)

Figure 1:
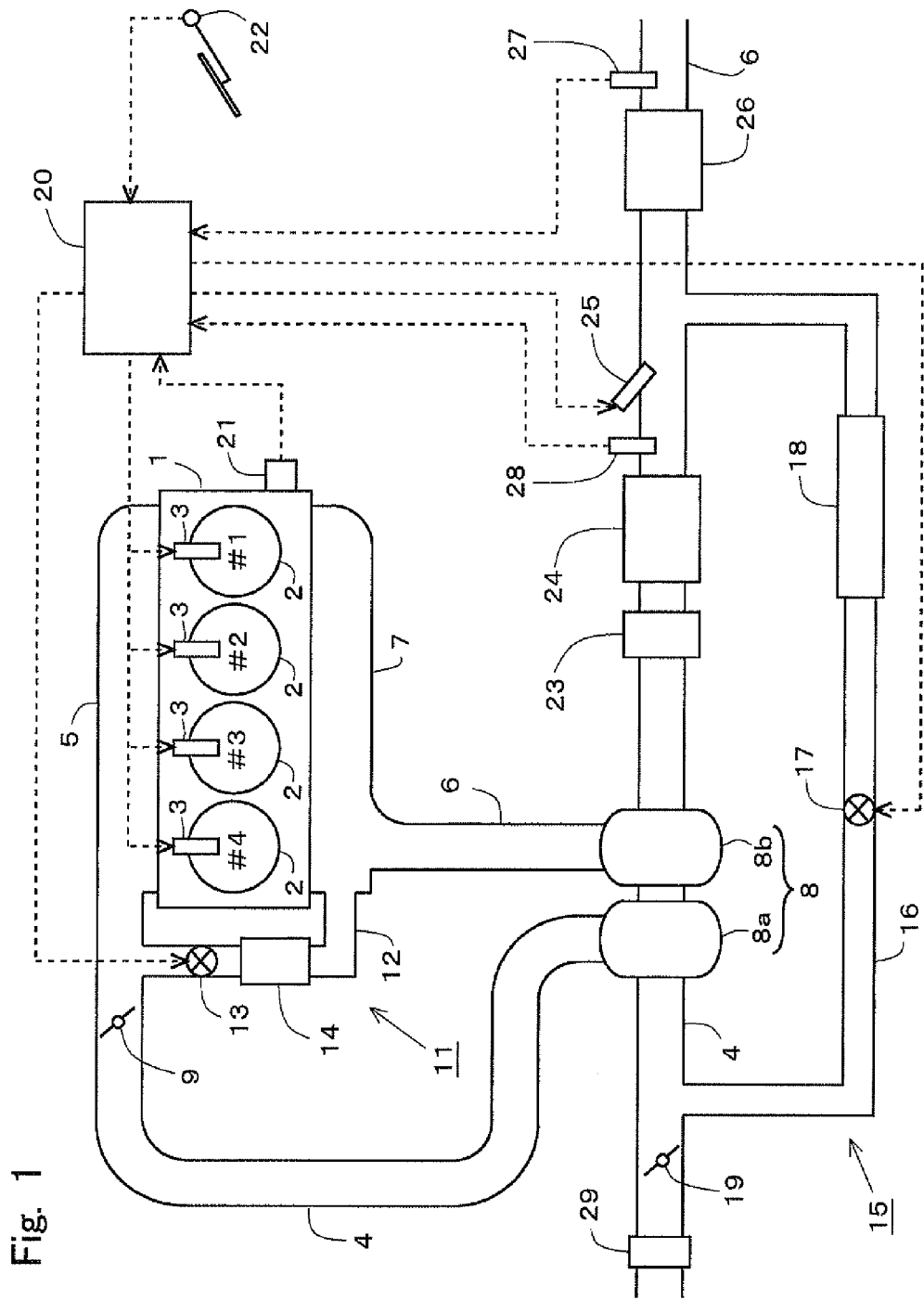
[FIG. 1] is a view showing the schematic construction of an internal combustion engine and its intake and exhaust systems according to a first embodiment of the present invention.

FIG. 1 is a view showing the schematic construction of an internal combustion engine and its intake and exhaust systems according to this first embodiment. The internal combustion engine 1 is a diesel engine having four cylinders 2 for driving a vehicle. Each of the cylinders 2 is provided with a fuel injection valve 3 that directly injects fuel into a corresponding cylinder 2.

An intake manifold 5 and an exhaust manifold 7 are connected to the internal combustion engine 1. An intake passage 4 is connected to the intake manifold 5. An exhaust passage 6 is connected to the exhaust manifold 7. A turbocharger 8 has a compressor 8a arranged in the intake passage 4. The turbocharger 8 has a turbine 8b arranged in the exhaust passage 6.

A first throttle valve 9 is arranged in the intake passage 4 at the downstream side of the compressor 8a. An air flow meter 29 and a second throttle valve 19 are arranged in the intake passage 4 at the upstream side of the compressor 8a.

In the exhaust passage 6 at the downstream side of the turbine 8b, there are arranged an oxidation catalyst 23, a particulate filter 24, and an NOx selective reduction catalyst 26 in a sequential manner from an upstream side along the direction of flow of an exhaust gas. In addition, between the particulate filter 24 and the NOx selective reduction catalyst 26 in the exhaust passage 6, there is arranged an ammonia derived compound addition valve 25 that serves to add an ammonia derived compound into the exhaust gas. The ammonia derived compound added from the ammonia derived compound addition valve 25 is supplied to the NOx selective reduction catalyst 26 as a reducing agent.

In this embodiment, the addition of the ammonia derived compound from the ammonia derived compound addition valve 25 is carried out at a predetermined interval of time during the operation of the internal combustion engine 1. A part of the ammonia derived compound supplied to the NOx selective reduction catalyst 26 adsorbs to the NOx selective reduction catalyst 26. When the addition of the ammonia derived compound from the ammonia derived compound addition valve 25 is stopped, the reduction of NOx is carried out by using, as the reducing agent, the ammonia derived compound which has adsorbed to the NOx selective reduction catalyst 26. Here, note that the ammonia derived compound may be added in any of the states of gas, liquid and solid. In this embodiment, the ammonia derived compound addition valve 25 corresponds to ammonia derived compound addition device according to the present invention.

A high pressure EGR device 11 and a low pressure EGR device 15 are arranged in the intake and exhaust systems of the internal combustion engine 1. The high pressure EGR device 11 is provided with a high pressure EGR passage 12, a high pressure EGR valve 13, and a high pressure EGR cooler 14. The high pressure EGR passage 12 is connected at one end thereof to the exhaust manifold 7, and is also connected at the other end thereof to a portion of the intake passage 4 at the downstream side of the first throttle valve 9.

The high pressure EGR valve 13 and the high pressure EGR cooler 14 are arranged in the high pressure EGR passage 12. The flow rate of a high pressure EGR gas, which is introduced into the intake passage 4 from the exhaust manifold 7 by way of the high pressure EGR passage 12, is controlled by means of the high pressure EGR valve 13.

The low pressure EGR device 15 is provided with a low pressure EGR passage 16, a low pressure EGR valve 17, and a low pressure EGR cooler 18. The low pressure EGR passage 16 is connected at one end thereof to a portion of the exhaust passage 6 at the downstream side of the ammonia derived compound addition valve 25 and at the upstream side of the NOx selective reduction catalyst 26, and is also connected at the other end thereof to a portion of the intake passage 4 at the downstream side of the second throttle valve 19 and at the upstream side the compressor 8a.

The low pressure EGR valve 17 and the low pressure EGR cooler 18 are arranged in the low pressure EGR passage 16. The flow rate of a low pressure EGR gas, which is introduced into the intake passage 4 from the exhaust passage 6 by way of the low pressure EGR passage 16, is controlled by means of the low pressure EGR valve 17.

Here, note that in FIG. 1, the high pressure EGR valve 13 is arranged in a portion of the high pressure EGR passage 12 at the downstream side of the high pressure EGR cooler 14, and the low pressure EGR valve 17 is arranged in a portion of the low pressure EGR passage 16 at the downstream side the low pressure EGR cooler 18. However, the high pressure EGR valve 13 may also be arranged in a portion of the high pressure EGR passage 12 at the upstream side of the high pressure EGR cooler 14, and the low pressure EGR valve 17 may also be arranged in a portion of the low pressure EGR passage 16 at the upstream side the low pressure EGR cooler 18. Irrespective of such an arrangement of the individual EGR valves 13, 17 in the individual EGR passages 12, 16, it is possible to carry out the control of the individual EGR valves 13, 17, which is to be described later.

A temperature sensor 27 for detecting the temperature of the exhaust gas is arranged in a portion of the exhaust passage 6 at the downstream side of the NOx selective reduction catalyst 26. In addition, an NOx sensor 28 for detecting the concentration of NOx in the exhaust gas is arranged in a portion of the exhaust passage 6 at the downstream side of the particulate filter 24 and at the upstream side of a connection portion of the low pressure EGR passage 16.

An electronic control unit (ECU) 20 is provided in combination with the internal combustion engine 1 as constructed in the above-mentioned manner. The air flow meter 29, the temperature sensor 27, the NOx sensor 28, a crank position sensor 21, and an accelerator opening sensor 22 are electrically connected to the ECU 20. The output signals of these sensors are inputted to the ECU 20. The crank position sensor 21 is a sensor for detecting the crank angle of the internal combustion engine 1. Also, the accelerator opening sensor 22 is a sensor for detecting the degree of opening of an accelerator of a vehicle carrying thereon the internal combustion engine 1.

In addition, the fuel injection valve 3, the first throttle valve 9, the second throttle valve 19, the ammonia derived compound addition valve 25, the high pressure EGR valve 13, and the low pressure EGR valve 17 are electrically connected to the ECU 20. Thus, these components are controlled by the ECU 20.

In this embodiment, the ECU 20 estimates the amount of NOx in the exhaust gas based on the amount of intake air detected by the air flow meter 29 and the concentration of NOx in the exhaust gas detected by the NOx sensor 28. Moreover, the ECU 20 decides the amount of addition of the ammonia derived compound at the time of adding the ammonia derived compound from the ammonia derived compound addition valve 25, based on the amount of NOx thus calculated or estimated and the temperature of the exhaust gas detected by the temperature sensor 27.

Here, note that in this embodiment, the ammonia derived compound addition valve 25 corresponds to the ammonia derived compound addition device according to the present invention.

(Control of EGR Valves)

In this embodiment, when the ammonia derived compound is added from the ammonia derived compound addition valve 25, the ammonia derived compound will pass through the connection portion of the low pressure EGR passage 16 (hereinafter simply referred to as a low pressure EGR passage connection portion) in the exhaust passage 6. At this time, if the low pressure EGR valve 17 is in an open state so that the introduction of the low pressure EGR gas into the intake passage 4 is carried out, there will be a fear that a part of the ammonia derived compound may flow into the low pressure EGR passage 16 together with the exhaust gas.

Accordingly, in this embodiment, at the time when the ammonia derived compound is added from the ammonia derived compound addition valve 25, the low pressure EGR valve 17 is closed. As a result of this, the circulation of the EGR gas in the low pressure EGR passage 16 is stopped. Thus, the inflow of the ammonia derived compound into the low pressure EGR passage 16 can be suppressed. As a result, the corrosion of component parts of the EGR system, such as the low pressure EGR valve 17, the low pressure EGR cooler 18 and so on, can be suppressed. In addition, the inflow of the ammonia derived compound into the intake passage 4 is suppressed. For that reason, it is possible to suppress the corrosion of component parts of the intake system such as a housing and an impeller of the compressor 8a, the first throttle valve 9, etc., and component parts of the engine such as valve seats, piston rings, etc.

In addition, when the ammonia derived compound is polymerized with formaldehyde in the exhaust gas, urea resin is produced. When the ammonia derived compound is coupled with sulfuric acid or nitric acid in the exhaust gas, ammonium sulfate or ammonium nitrate is produced. If products such as these flow into the low pressure EGR passage 16 and the intake passage 4, there will be a fear that trouble or defects may occur in the component parts of the EGR system and the component parts of the intake system. According to this embodiment, however, it is also possible to suppress the inflow of these products to the low pressure EGR passage 16 and the intake passage 4. As a result, it is possible to suppress the occurrence of trouble or defects in the component parts of the EGR system and the component parts of the intake system resulting from such products.

(Control Flow)

Figure 2:
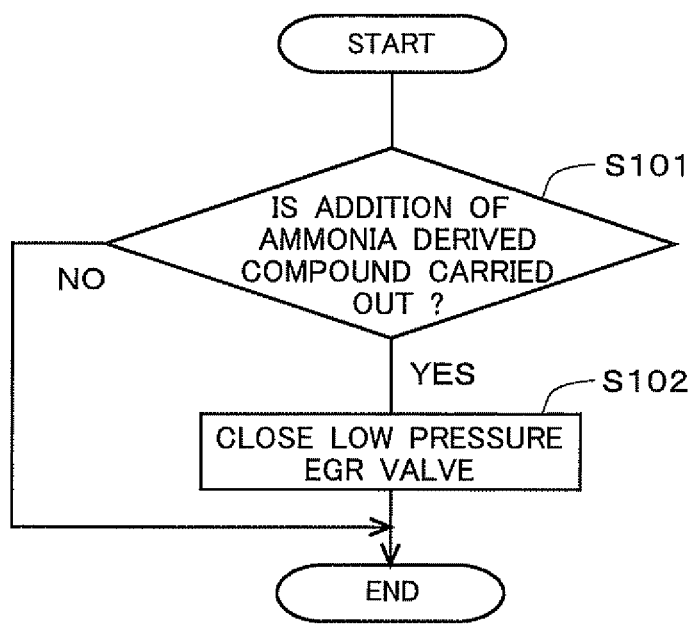
[FIG. 2] is a flow chart showing a control flow for a low pressure EGR valve according to the first embodiment.

A control flow for the low pressure EGR valve according to this embodiment will be described based on a flow chart shown in FIG. 2. This flow has been beforehand stored in the ECU 20, and is carried out in a repeated manner by the ECU 20 during the operation of the internal combustion engine 1.

In this flow, first in step S101, it is determined whether the addition of the ammonia derived compound from the ammonia derived compound addition valve 25 is carried out. In step S101, in cases where an affirmative determination is made, the processing of step S102 is then carried out, whereas in cases where a negative determination is made, the execution of this flow is once ended.

In step S102, the low pressure EGR valve 17 is closed. Thereafter, the execution of this flow is once ended.

Here, note that in this embodiment, the ECU 20, which carries out the processing of step S102 in the above-mentioned flow, corresponds to controller according to the present invention.

(Relation Between an Addition Period of Time of Ammonia Derived Compound and a Closed Period of Time of Low Pressure EGR Valve)

Figure 3:
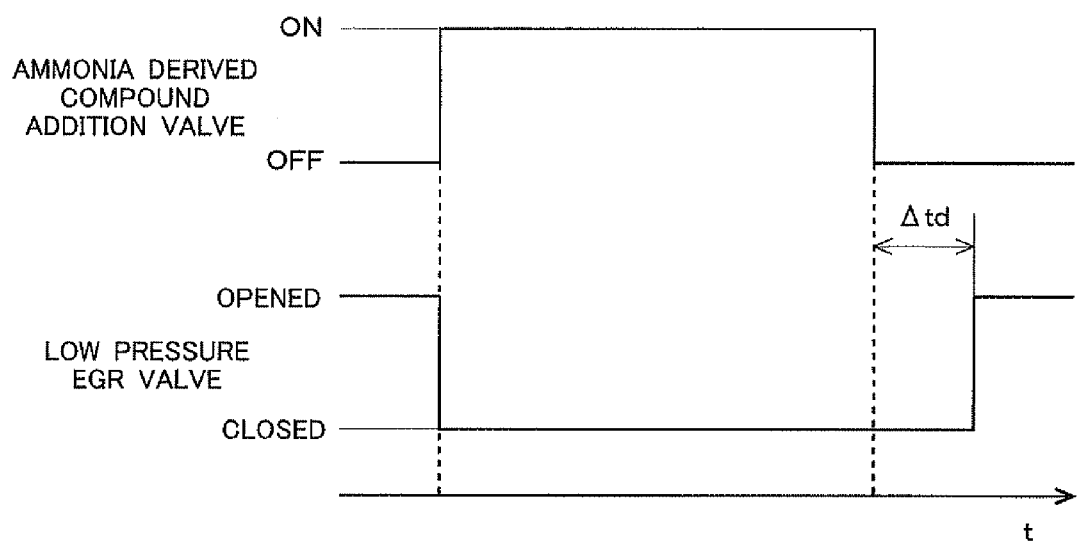
[FIG. 3] is a view showing command signals from an ECU to an ammonia derived compound addition valve and a low pressure EGR valve according to the first embodiment.

FIG. 3 is a view showing command signals from the ECU 20 to the ammonia derived compound addition valve 25 and the low pressure EGR valve 17. As shown in FIG. 3, in this embodiment, the low pressure EGR valve 17 is closed at the time when the addition of the ammonia derived compound from the ammonia derived compound addition valve 25 is started. Then, after a predetermined period of time Δtd has elapsed from the time when the addition of the ammonia derived compound from the ammonia derived compound addition valve 25 is stopped, the low pressure EGR valve 17 is opened so that the introduction of the low pressure EGR gas into the intake passage 4 is resumed.

There will be a time lag after the ammonia derived compound has been added from the ammonia derived compound addition valve 25 until the time when the ammonia derived compound arrives at the low pressure EGR passage connection portion. The predetermined period of time Δtd is a period of time which corresponds to the time lag. In this manner, by placing the low pressure EGR valve 17 in a closed state for the predetermined period of time Δtd even after the addition of the ammonia derived compound has been stopped, it is possible to suppress the inflow of the ammonia derived compound into the low pressure EGR passage 16 in a more effective manner.

Here, note that the length of the time lag after the ammonia derived compound has been added from the ammonia derived compound addition valve 25 until the time when the ammonia derived compound arrives at the low pressure EGR passage connection portion changes according to the flow rate of the exhaust gas. Accordingly, the predetermined period of time Δtd may be set based on the flow rate of the exhaust gas. In addition, the valve closing time or timing of the low pressure EGR valve 17 may also be set to be after the predetermined period of time Δtd has elapsed from the time when the addition of the ammonia derived compound has been started, similar to the valve opening time or timing of the low pressure EGR valve 17.

In this embodiment, by placing the low pressure EGR valve 17 into a fully closed state at the time when the ammonia derived compound is added from the ammonia derived compound addition valve 25, it is possible to suppress the inflow of the ammonia derived compound to the low pressure EGR passage 16 and the intake passage 4 in a reliable manner. However, it may be difficult to stop the supply of the low pressure EGR gas to the internal combustion engine 1, depending on an operating state of the internal combustion engine 1. In such a case, there is no need to necessarily place the low pressure EGR valve 17 into the fully closed state. By decreasing the degree of opening of the low pressure EGR valve 17 at the time when the ammonia derived compound is added from the ammonia derived compound addition valve 25, it is possible to decrease the flow rate of the EGR gas flowing through the low pressure EGR passage 16 in comparison with the case when the ammonia derived compound is not added. As a result of this, it is possible to suppress the inflow of the ammonia derived compound to the low pressure EGR passage 16 and the intake passage 4.

Moreover, in this embodiment, the flow rate of the EGR gas flowing through the low pressure EGR passage 16 may be decreased by carrying out other control, instead of decreasing the degree of opening of the low pressure EGR valve 17, at the time when the ammonia derived compound is added from the ammonia derived compound addition valve 25. For example, by increasing the degree of opening of the second throttle valve 19, too, it is possible to decrease the flow rate of the EGR gas flowing through the low pressure EGR passage 16. In addition, in cases where an exhaust throttle valve is arranged in a portion of the exhaust passage 6 at the downstream side of the NOx selective reduction catalyst 26 (i.e., at the downstream side of the connection portion of the low pressure EGR passage 16 in the exhaust passage 6), it is possible to decrease the flow rate of the EGR gas flowing through the low pressure EGR passage 16 by increasing the degree of opening of the exhaust throttle valve, too. Further, the flow rate of the EGR gas flowing through the low pressure EGR passage 16 may be decreased by carrying out an appropriate combination of the control of decreasing the degree of opening of the low pressure EGR valve 17, the control of increasing the degree of opening of the second throttle valve 19, the control of increasing the degree of opening of the exhaust throttle valve, and so on.

(Modifications)

Figure 4:
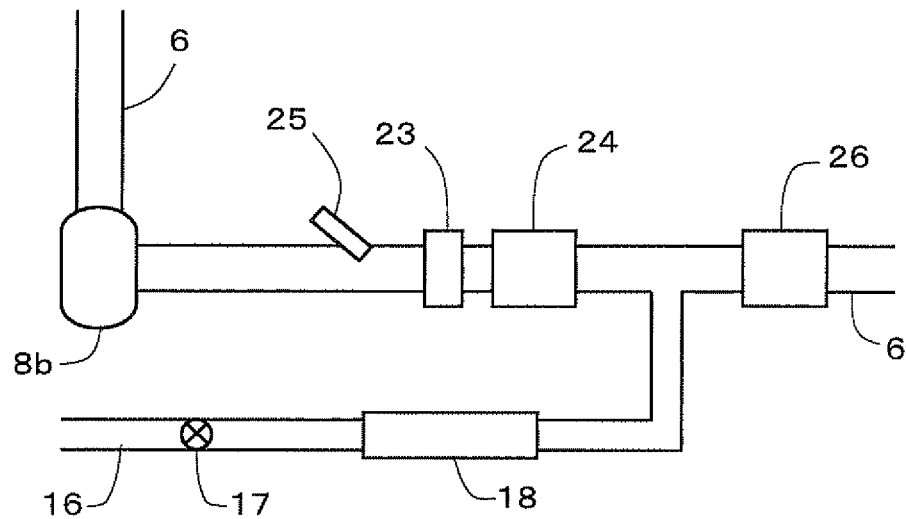
[FIG. 4] is a view showing the schematic construction of an exhaust system of an internal combustion engine according to a modified form of the first embodiment.
Figure 5:
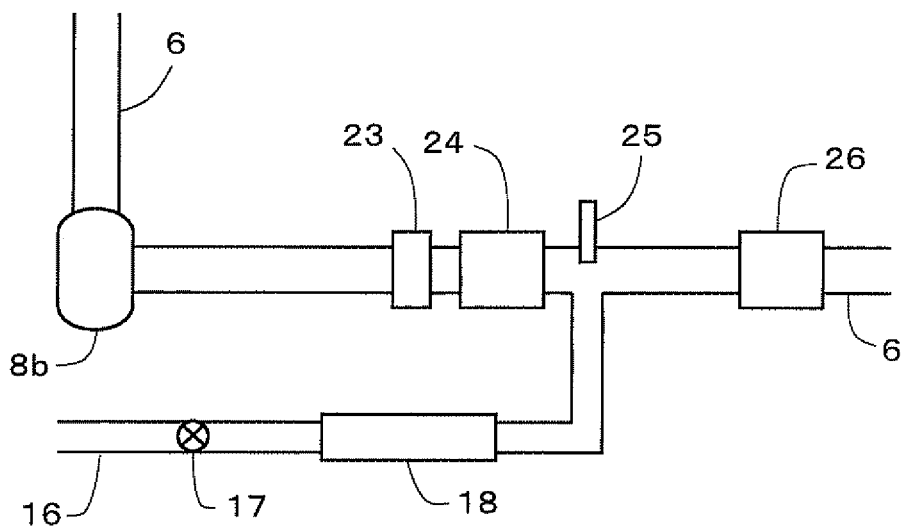
[FIG. 5] is a view showing the schematic construction of an exhaust system of an internal combustion engine according to another modified form of the first embodiment.
Figure 6:
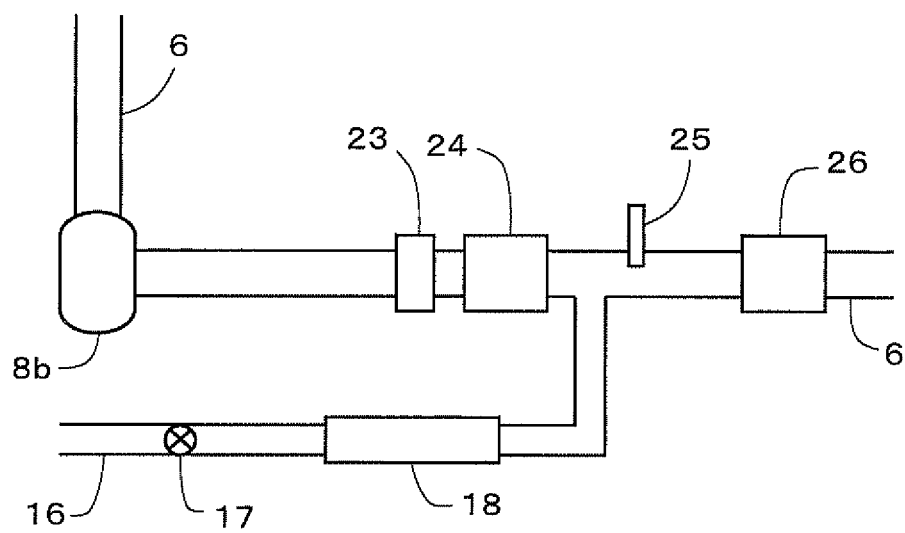
[FIG. 6] is a view showing the schematic construction of an exhaust system of an internal combustion engine according to a further modified form of the first embodiment.

FIGS. 4 through 6 are views showing modified forms of the construction of the exhaust system of the internal combustion engine according to this embodiment. Here, note that in FIGS. 4 through 6, the NOx sensor 28 and the temperature sensor 27 are omitted. In FIG. 4, the ammonia derived compound addition valve 25 is arranged in a portion of the exhaust passage 6 at the upstream side of the oxidation catalyst 23. In FIG. 5, the ammonia derived compound addition valve 25 is arranged in the exhaust passage 6 in a position which is substantially the same as that of the connection portion of the low pressure EGR passage 16 in the direction of flow of the exhaust gas, and which is in opposition to an opening portion of the low pressure EGR passage 16. Even with such a construction as shown in FIG. 4 or 5, at least a part of the ammonia derived compound added from the ammonia derived compound addition valve 25 arrives at the connection portion of the low pressure EGR passage 16.

In addition, even in cases where the ammonia derived compound addition valve 25 is arranged in a portion of the exhaust passage 6 at the downstream side of the connection portion of the low pressure EGR passage 16, if the position of the ammonia derived compound addition valve 25 is in the vicinity of the connection portion, at least a part of the ammonia derived compound added from the ammonia derived compound addition valve 25 may arrive at the connection portion of the low pressure EGR passage 16, due to the pulsation of the exhaust gas and/or the drawing of the exhaust gas into the low pressure EGR passage 16. In FIG. 6, the ammonia derived compound addition valve 25 is arranged in a portion of the exhaust passage 6 which is at the downstream side of the connection portion of the low pressure EGR passage 16, and which is in a range in which at least a part of the ammonia derived compound added from the ammonia derived compound addition valve 25 arrives at the connection portion of the low pressure EGR passage 16.

Even with the constructions as shown in these modifications, the same effects as those stated above can be obtained by controlling the low pressure EGR valve 17 in the same manner as described above. In addition, even with the constructions as shown in these modifications, the same effects as those stated above can be obtained by controlling the second throttle valve 19, the exhaust throttle valve and so on in the same manner as described above.

<Second Embodiment>

Reference will be made to a second embodiment of the present invention based on FIGS. 7 through 9. Here, only those which are different from the first embodiment will be explained.

(Schematic Construction of Internal Combustion Engine and Intake and Exhaust Systems)

Figure 7:
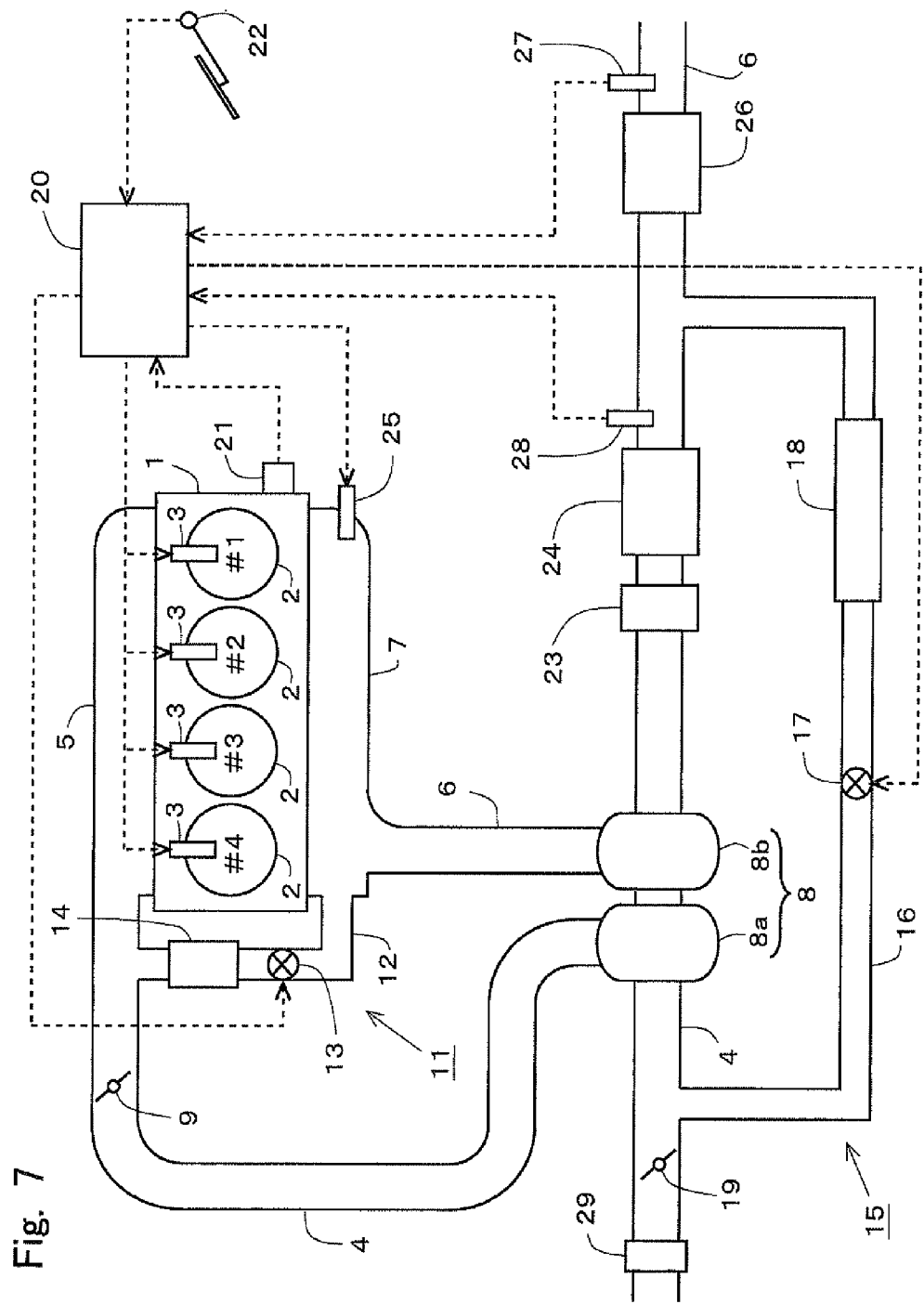
[FIG. 7] is a view showing the schematic construction of an internal combustion engine and its intake and exhaust systems according to a second embodiment of the present invention.
Figure 8:
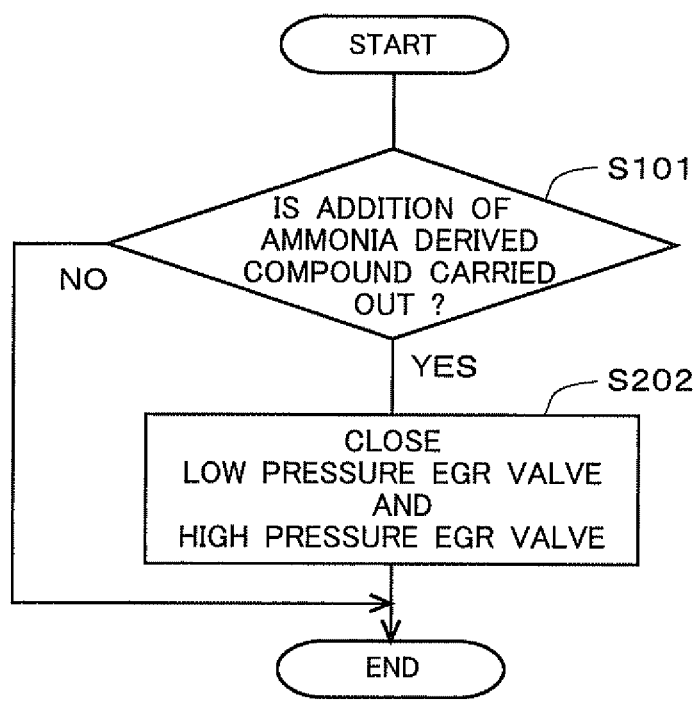
[FIG. 8] is a flow chart showing a control flow for a low pressure EGR valve and a high pressure EGR valve according to the second embodiment.

FIG. 7 is a view showing the schematic construction of an internal combustion engine and its intake and exhaust systems according to this second embodiment. In this embodiment, the arrangement of the ammonia derived compound addition valve 25 in the exhaust system is different from that in the first embodiment. In this embodiment, the ammonia derived compound addition valve 25 is arranged in a portion of the exhaust manifold 7 at the upstream side of the connection portion of the high pressure EGR passage 12 along the flow of exhaust gas.

(Control of EGR Valves)

In this embodiment, when the ammonia derived compound is added from the ammonia derived compound addition valve 25, the ammonia derived compound will pass not only through the connection portion of the low pressure EGR passage 16 in the exhaust passage 6, but also through the connection portion of the high pressure EGR passage 12 in the exhaust manifold 7. At this time, when the ammonia derived compound arrives at the connection portion of the high pressure EGR passage 12 in the exhaust manifold 7, if the high pressure EGR valve 13 is in an open state so that the introduction of the high pressure EGR gas into the intake passage 4 is carried out, there will be a fear that a part of the ammonia derived compound may flow into the high pressure EGR passage 12 together with the exhaust gas.

Accordingly, in this embodiment, at the time when the ammonia derived compound is added from the ammonia derived compound addition valve 25, the low pressure EGR valve 17 and the high pressure EGR valve 13 are closed. As a result of this, the circulation of the EGR gas in the low pressure EGR passage 16 and the high pressure EGR passage 12 is stopped. Accordingly, it is possible to suppress the inflow of the ammonia derived compound to the low pressure EGR passage 16 and the high pressure EGR passage 12. As a result, the same effects as those in the first embodiment can be obtained.

(Control Flow)

A control flow for the low pressure EGR valve and the high pressure EGR valve according to this embodiment will be described based on a flow chart shown in FIG. 8. This flow has been beforehand stored in the ECU 20, and is carried out in a repeated manner by the ECU 20 during the operation of the internal combustion engine 1. Here, note that this flow is such that the step S102 in the flow chart shown in FIG. 2 is replaced by step S202. Therefore, only processing in step S202 will be explained.

In this flow, in cases where an affirmative determination is made in step S101, the processing of step S202 is then carried out. In step S202, the low pressure EGR valve 17 and the high pressure EGR valve 13 are closed. Thereafter, the execution of this flow is once ended.

Here, note that in this embodiment, the ECU 20, which carries out the processing of step S202 in the above-mentioned flow, corresponds to the controller according to the present invention.

(Relation Between an Addition Period of Time of Ammonia Derived Compound and a Closed Period of Time of Each EGR Valve)

Figure 9:
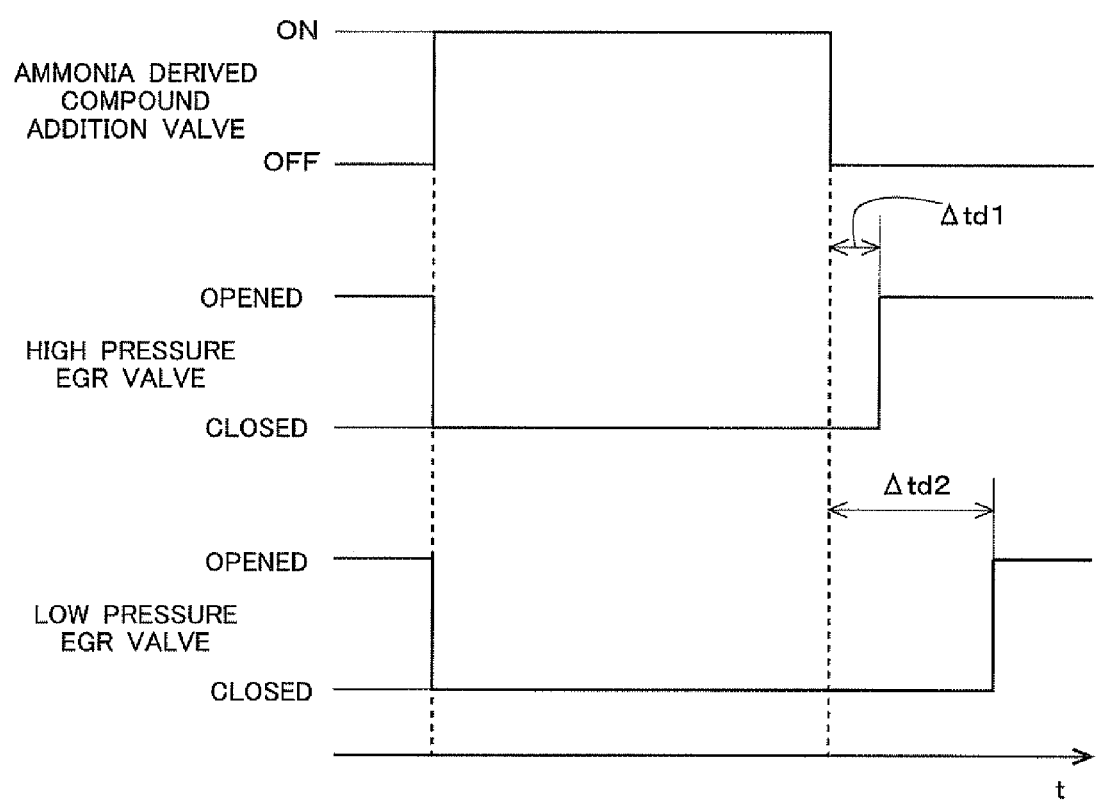
[FIG. 9] is a view showing command signals from an ECU to an ammonia derived compound addition valve, a high pressure EGR valve and a low pressure EGR valve according to the second embodiment.

FIG. 9 is a view showing command signals from the ECU 20 to the ammonia derived compound addition valve 25, the high pressure EGR valve 13 and the low pressure EGR valve 17. As shown in FIG. 9, in this embodiment, the high pressure EGR valve 13 and the low pressure EGR valve 17 are closed at the time when the addition of the ammonia derived compound from the ammonia derived compound addition valve 25 is started. Then, after a first predetermined period of time $\Delta td1$ has elapsed from the time when the addition of the ammonia derived compound from the ammonia derived compound addition valve 25 is stopped, the high pressure EGR valve 13 is opened so that the introduction of the high pressure EGR gas into the intake passage 4 is resumed. Also, after a second predetermined period of time $\Delta td2$ has elapsed from the time when the addition of the ammonia derived compound from the ammonia derived compound addition valve 25 is stopped, the low pressure EGR valve 17 is opened so that the introduction of the low pressure EGR gas into the intake passage 4 is resumed.

Here, the first predetermined period of time $\Delta td1$ is a period of time which corresponds to a time lag after the ammonia derived compound has been added from the ammonia derived compound addition valve 25 until the time when the ammonia derived compound arrives at the connection portion of the high pressure EGR passage 12 (hereinafter simply referred to as a high pressure EGR passage connection portion) in the exhaust manifold 7. In addition, the second predetermined period of time $\Delta td2$ is a period of time which corresponds to a time lag after the ammonia derived compound has been added from the ammonia derived compound addition valve 25 until the time when the ammonia derived compound arrives at the low pressure EGR passage connection portion. In this manner, by placing the high pressure EGR valve 13 in a closed state for the first predetermined period of time $\Delta td1$ and by placing the low pressure EGR valve 17 in a closed state for the second predetermined period of time $\Delta td2$ even after the addition of the ammonia derived compound has been stopped, it is possible to suppress the inflow of the ammonia derived compound into the high pressure EGR passage 12 and the low pressure EGR passage 16 in a more effective manner.

Here, note that the first and second predetermined periods of time $\Delta td1$, $\Delta td2$ may be set based on the flow rate of the exhaust gas, similar to the predetermined period of time $\Delta td$ in the first embodiment. In addition, the valve closing time or timing of the high pressure EGR valve 13 may also be set to be after the first predetermined period of time $\Delta td1$ has elapsed from the time when the addition of the ammonia derived compound has been started, similar to the valve opening time or timing of the high pressure EGR valve 13. Also, the valve closing time or timing of the low pressure EGR valve 17 may also be set to be after the second predetermined period of time $\Delta td2$ has elapsed from the time when the addition of the ammonia derived compound has been started, similar to the valve opening time or timing of the low pressure EGR valve 17.

In addition, similar to the case of the first embodiment, at the time when the ammonia derived compound is added from the ammonia derived compound addition valve 25, the high pressure EGR valve 13 and the low pressure EGR valve 17 are not necessarily placed into their fully closed states, respectively. By decreasing the degree of opening of the high pressure EGR valve 13 at the time when the ammonia derived compound is added from the ammonia derived compound addition valve 25, it is possible to decrease the flow rate of the EGR gas flowing through the high pressure EGR passage 12 in comparison with the case when the ammonia derived compound is not added. As a result of this, it is possible to suppress the inflow of the ammonia derived compound to the high pressure EGR passage 12 and the intake passage 4. Also, as described in the first embodiment, by decreasing the degree of opening of the low pressure EGR valve 17 at the time when the ammonia derived compound is added from the ammonia derived compound addition valve 25, it is possible to suppress the inflow of the ammonia derived compound to the low pressure EGR passage 16 and the intake passage 4.

Moreover, in this embodiment, the flow rate of the EGR gas flowing through the high pressure EGR passage 12 may be decreased by carrying out other control, instead of decreasing the degree of opening of the high pressure EGR valve 13, at the time when the ammonia derived compound is added from the ammonia derived compound addition valve 25. For example, by increasing the degree of opening of the first throttle valve 9, too, it is possible to decrease the flow rate of the EGR gas flowing through the high pressure EGR passage 12. In addition, in this embodiment, too, similar to the first embodiment, the flow rate of the EGR gas flowing through the low pressure EGR passage 16 may be decreased by controlling the second throttle valve 19, the exhaust throttle valve, etc., in place of or in addition to controlling the low pressure EGR valve 17, at the time when the ammonia derived compound is added from the ammonia derived compound addition valve 25.

In addition, the construction according to this embodiment may also be such that the ammonia derived compound addition valve 25 is arranged in an exhaust port which is connected to any of the four cylinders 2.

<Third Embodiment>

Reference will be made to a third embodiment of the present invention based on FIGS. 10 through 12. Here, only those which are different from the first embodiment will be explained.

(Schematic Construction of Internal Combustion Engine and Intake and Exhaust Systems)

Figure 10:
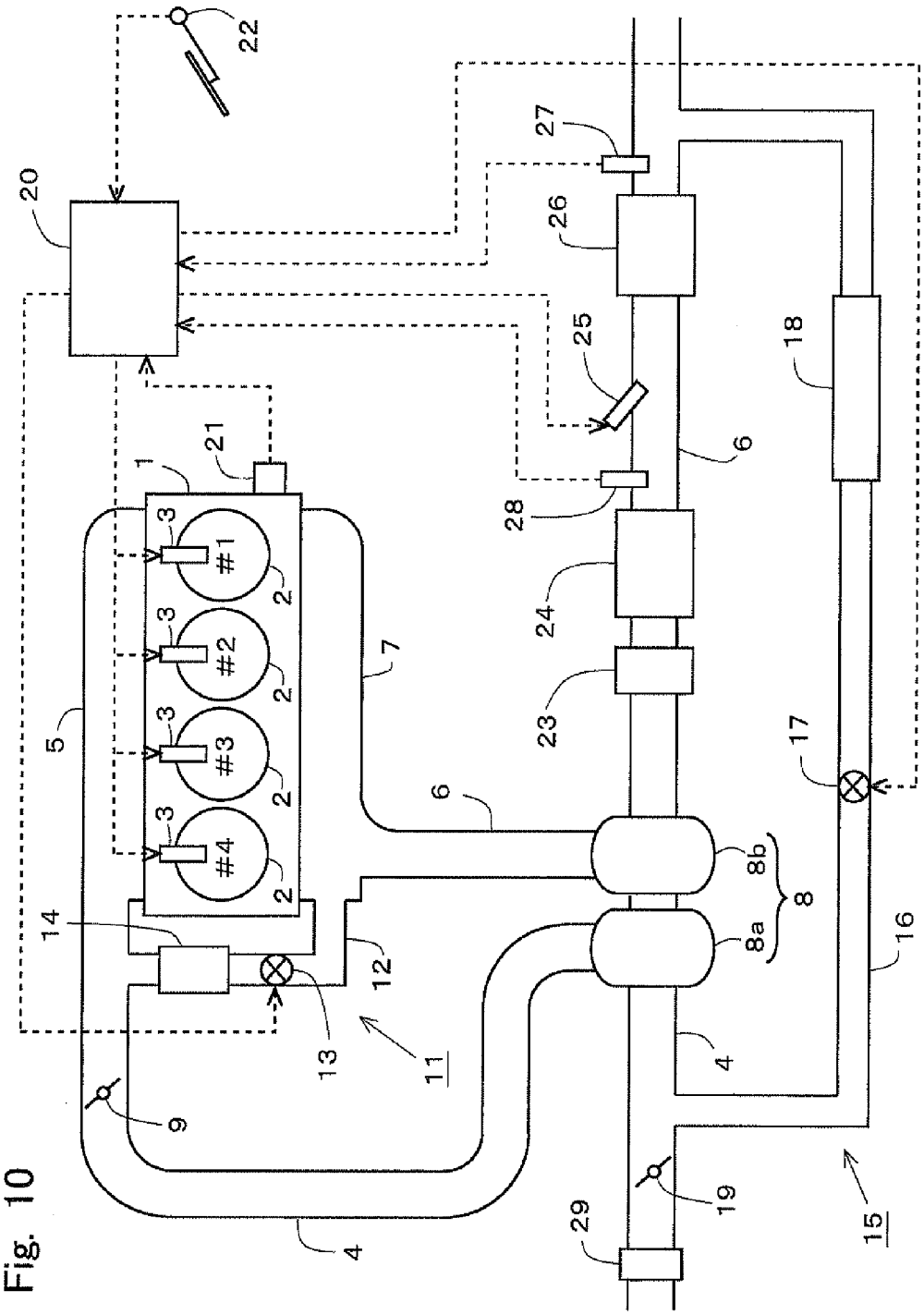
[FIG. 10] is a view showing the schematic construction of an internal combustion engine and its intake and exhaust systems according to a third embodiment of the present invention.

FIG. 10 is a view showing the schematic construction of an internal combustion engine and its intake and exhaust systems according to this third embodiment. In this embodiment, the connection position of one end of the low pressure EGR passage 16 in the exhaust passage 6 is different from that in the first embodiment. In this embodiment, the one end of the low pressure EGR passage 16 is connected to a portion of the exhaust passage 6 at the downstream side of the NOx selective reduction catalyst 26.

(Control of EGR Valves)

According to the construction of this embodiment, it is more difficult for the ammonia derived compound added from the ammonia derived compound addition valve 25 to flow into the low pressure EGR passage 16, in comparison with the case where the low pressure EGR passage 16 is connected to a portion of the exhaust passage 6 at the upstream side of the NOx selective reduction catalyst 26. However, apart of the ammonia derived compound, which has been added from the ammonia derived compound addition valve 25 and which has been supplied to the NOx selective reduction catalyst 26, may flow out to the downstream side of the NOx selective reduction catalyst 26, without being used for the reduction of NOx in the NOx selective reduction catalyst 26.

In this case, there is a fear that the ammonia derived compound having flowed out of the NOx selective reduction catalyst 26 may flow into the low pressure EGR passage 16. Accordingly, in this embodiment, too, at the time when the ammonia derived compound is added from the ammonia derived compound addition valve 25, the degree of opening of the low pressure EGR valve 17 is decreased in order to decrease the flow rate of the EGR gas flowing through the low pressure EGR passage 16.

Figure 11:
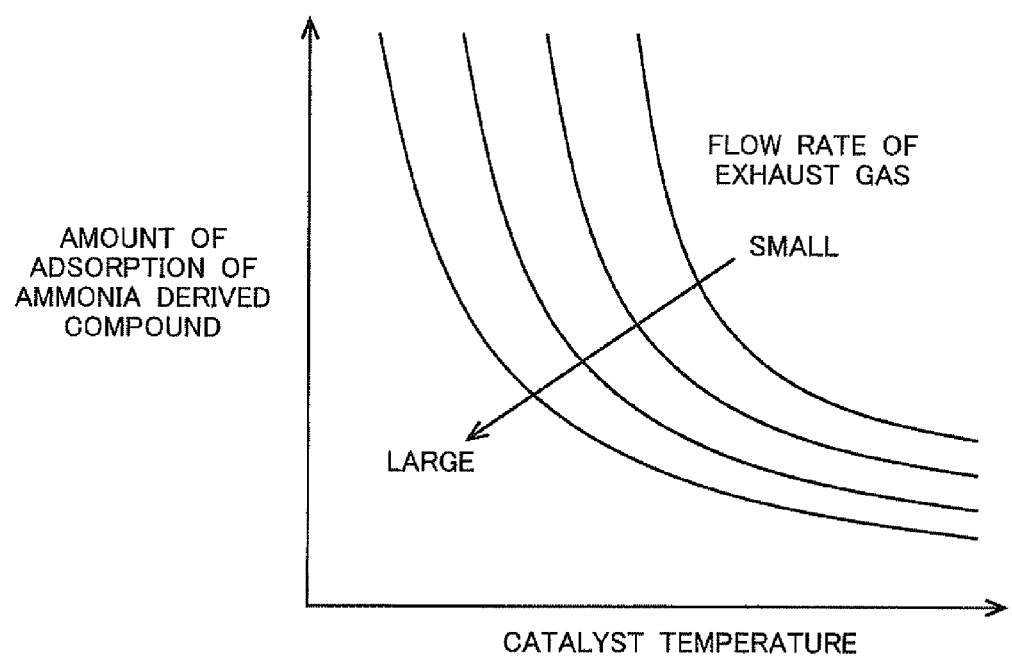
[FIG. 11] is a view showing the relation among the amount of adsorption of an ammonia derived compound in an NOx selective reduction catalyst, the catalyst temperature and the flow rate of exhaust gas according to the third embodiment.
Figure 12:
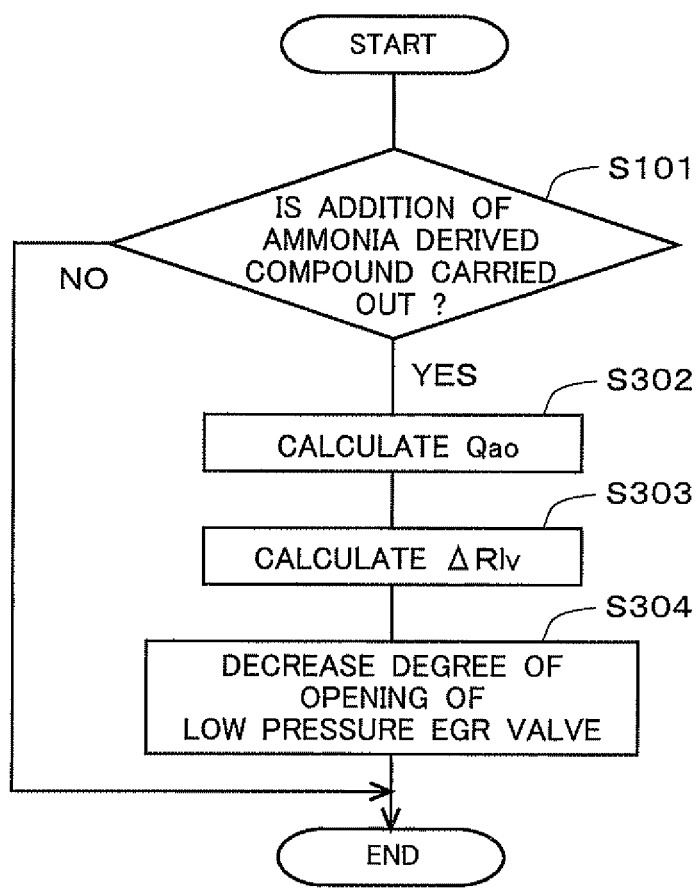
[FIG. 12] is a flow chart showing a control flow for a low pressure EGR valve according to the third embodiment.

FIG. 11 is a view showing the relation among the amount of adsorption of the ammonia derived compound in the NOx selective reduction catalyst 26, the catalyst temperature and the flow rate of exhaust gas. In FIG. 11, the axis of ordinate represents the amount of adsorption of the ammonia derived compound, and the axis of abscissa represents the temperature of the NOx selective reduction catalyst 26. As shown in FIG. 11, the amount of adsorption of the ammonia derived compound in the NOx selective reduction catalyst 26 changes according to the temperature of the NOx selective reduction catalyst 26 and the flow rate of the exhaust gas.

As a result, an outflow amount of the ammonia derived compound flowing out of the NOx selective reduction catalyst 26 changes according to the temperature of the NOx selective reduction catalyst 26, the flow rate of the exhaust gas, etc. In other words, the higher the temperature of the NOx selective reduction catalyst 26, and the larger the flow rate of the exhaust gas, the larger becomes the outflow amount of the ammonia derived compound flowing out of the NOx selective reduction catalyst 26.

Accordingly, in this embodiment, at the time when the degree of opening of the low pressure EGR valve 17 is decreased, the degree of opening of the low pressure EGR valve 17 is made larger in cases where the amount of the ammonia derived compound flowing out to the downstream side of the NOx selective reduction catalyst 26 is small, in comparison with the case where that amount of the ammonia derived compound is large. That is, in cases where the amount of the ammonia derived compound flowing out to the downstream side of the NOx selective reduction catalyst 26 is small, the flow rate of the EGR gas flowing through the low pressure EGR passage 16 is made larger in comparison with the case where that amount of the ammonia derived compound is large. According to this, a decrease in the amount of the low pressure EGR gas can be suppressed as much as possible, while suppressing the inflow of the ammonia derived compound into the low pressure EGR passage 16.

(Control Flow)

A control flow for the low pressure EGR valve according to this embodiment will be described based on a flow chart shown in FIG. 12. This flow has been beforehand stored in the ECU 20, and is carried out in a repeated manner by the ECU 20 during the operation of the internal combustion engine 1. Here, note that this flow is such that the step S102 in the flow chart shown in FIG. 2 is replaced by steps S302 through S304. Therefore, only processing in steps S302 through S304 will be explained.

In this flow, in cases where an affirmative determination is made in step S101, the processing of step S302 is then carried out. In step S302, the outflow amount Qao of the ammonia derived compound flowing out of the NOx selective reduction catalyst 26 at the time when the ammonia derived compound is added from the ammonia derived compound addition valve 25 is calculated.

In the ECU 20, there has been beforehand stored a map which represents the relation among the amount of adsorption of the ammonia derived compound in the NOx selective reduction catalyst 26, the catalyst temperature and the flow rate of the exhaust gas, as shown in FIG. 11. In step 302, the outflow amount Qao of the ammonia derived compound is calculated based on the amount of adsorption of the ammonia derived compound, which is obtained by the use of the map, and the amount of addition of the ammonia derived compound from the ammonia derived compound addition valve 25.

Here, note that in this embodiment, the temperature of the NOx selective reduction catalyst 26 can be estimated based on the detected value of the temperature sensor 27. Also, the flow rate of the exhaust gas can be estimated based on the detected value of the air flow meter 29, etc.

In addition, in this embodiment, NOx sensors each for detecting the concentration of NOx in the exhaust gas may be arranged in the exhaust passage 6 before and after the NOx selective reduction catalyst 26, respectively, or an NOx sensor may be arranged in the exhaust passage 6 at the downstream side of the NOx selective reduction catalyst 26. In this case, in step S302, the outflow amount Qao of the ammonia derived compound may be calculated based on a change in the detected value(s) of the NOx sensor(s) at the time of carrying out the addition of the ammonia derived compound from the ammonia derived compound addition valve 25.

Then, in step S303, a decreased amount ΔRlv of the degree of opening of the low pressure EGR valve 17 is calculated based on a current operating state of the internal combustion engine 1 and the outflow amount Qao of the ammonia derived compound. The relation between the operating state of the internal combustion engine 1, the outflow amount Qao of the ammonia derived compound, and the decreased amount ΔRlv of the degree of opening of the low pressure EGR valve 17 have been beforehand stored in the ECU 20 as a map. In this map, the smaller the outflow amount Qao of the ammonia derived compound, the smaller becomes the decreased amount ΔRlv of the degree of opening of the low pressure EGR valve 17. In step S303, the decreased amount ΔRlv of the degree of opening of the low pressure EGR valve 17 is calculated by the use of this map.

Subsequently, in step S304, the degree of opening of the low pressure EGR valve 17 is decreased by the decreased amount ΔRlv which has been calculated in step S303. Thereafter, the execution of this flow is once ended.

Here, note that in this embodiment, the ECU 20 may have beforehand stored therein a map in which the operating state of the internal combustion engine 1 is divided into two regions, in one of which the outflow amount Qao of the ammonia derived compound at the time when the ammonia derived compound is added from the ammonia derived compound addition valve 25 is relatively large, and in the other of which it is relatively small. Then, the decreased amount ΔRlv of the degree of opening of the low pressure EGR valve 17 corresponding to each of the regions may have been set beforehand.

In this case, the decreased amount ΔRlv of the degree of opening of the low pressure EGR valve 17 corresponding to the region in which the outflow amount Qao of the ammonia derived compound is relatively small is set to be a value smaller than the decreased amount ΔRlv of the degree of opening of the low pressure EGR valve 17 corresponding to the region in which the outflow amount Qao of the ammonia derived compound is relatively large. Then, the decreased amount ΔRlv of the degree of opening of the low pressure EGR valve 17 is decided by whether the operating state of the internal combustion engine 1 at the time of carrying out the addition of the ammonia derived compound from the ammonia derived compound addition valve 25 falls into one or the other of these regions.

In this embodiment, the ECU 20, which carries out the processing of step S304 in the above-mentioned flow, corresponds to the controller according to the present invention.

Moreover, in this embodiment, too, similar to the first embodiment, the flow rate of the EGR gas flowing through the low pressure EGR passage 16 may be decreased by controlling the second throttle valve 19, the exhaust throttle valve, etc., in place of or in addition to controlling the low pressure EGR valve 17, at the time when the ammonia derived compound is added from the ammonia derived compound addition valve 25. In this case, too, the degree of opening of the second throttle valve 19, the degree of opening of the exhaust throttle valve, or the like is controlled in such a manner that when the amount of the ammonia derived compound flowing out to the downstream side of the NOx selective reduction catalyst 26 is small, the flow rate of the EGR gas flowing through the low pressure EGR passage 16 is made larger in comparison with the case when that amount of the ammonia derived compound is large.

<Fourth Embodiment>

Figure 13:
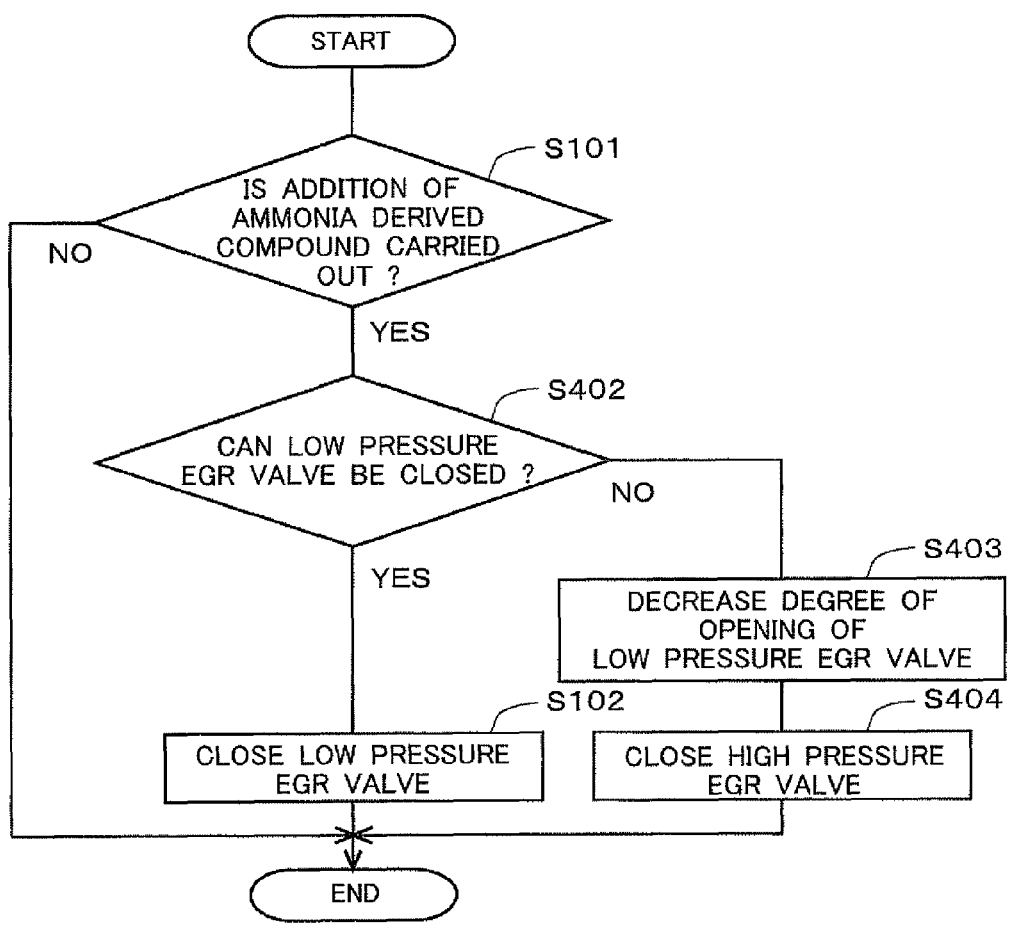
[FIG. 13] is a flow chart showing a control flow for a low pressure EGR valve and a high pressure EGR valve according to a fourth embodiment of the present invention.

Reference will be made to a fourth embodiment of the present invention based on FIG. 13. Here, note that only those which are different from the first embodiment will be explained.

(Control of EGR Valves)

Depending on the operating state of the internal combustion engine 1, it may be difficult to supply a sufficient amount of EGR gas to the internal combustion engine 1 by means of the high pressure EGR device 11. In such a case, even when the ammonia derived compound is added from the ammonia derived compound addition valve 25, it is necessary to ensure the supply of the EGR gas by means of the low pressure EGR device 15. In this embodiment, in such a case, the degree of opening of the low pressure EGR valve 17 is made to decrease, without placing the low pressure EGR valve 17 into a fully closed state. According to this, a necessary minimum amount of low pressure EGR gas can be ensured.

Even when the degree of opening of the low pressure EGR valve 17 is decreased, unless the low pressure EGR valve 17 is placed into the fully closed state thereby to stop the circulation of the EGR gas in the low pressure EGR passage 16, the ammonia derived compound may flow into the low pressure EGR passage 16. Then, when the ammonia derived compound is supplied to the internal combustion engine 1 through the low pressure EGR passage 16, the ammonia derived compound may be discharged from the internal combustion engine 1 to the exhaust manifold 7 together with the exhaust gas. At this time, if the high pressure EGR valve 13 is in an open state so that the introduction of the high pressure EGR gas into the intake passage 4 is carried out, there will be a fear that the ammonia derived compound discharged to the exhaust manifold 7 may flow into the high pressure EGR passage 12.

Accordingly, in this embodiment, when the ammonia derived compound is added from the ammonia derived compound addition valve 25, and in cases where the low pressure EGR valve 17 is not placed into the fully closed state, the high pressure EGR valve 13 is closed, whereby the circulation of the EGR gas in the high pressure EGR passage 12 is stopped. As a result of this, even in cases where the ammonia derived compound is discharged to the exhaust system from the internal combustion engine 1, it is possible to suppress the ammonia derived compound from flowing into the high pressure EGR passage 12.

(Control Flow)

A control flow for the low pressure EGR valve and the high pressure EGR valve according to this embodiment will be described based on a flow chart shown in FIG. 13. This flow has been beforehand stored in the ECU 20, and is carried out in a repeated manner by the ECU 20 during the operation of the internal combustion engine 1. Here, note that in this flow, steps S402 through S404 are added to the flow shown in FIG. 2. Therefore, only processing in steps S402 through S404 will be explained.

In this flow, incases where an affirmative determination is made in step S101, the processing of step S402 is then carried out. In step S402, it is determined based on the operating state of the internal combustion engine 1 whether it is possible to place the low pressure EGR valve 17 into a fully closed state. In step S402, when an affirmative determination is made, the processing of step S102 is then carried out, whereas when a negative determination is made, the processing of step S403 is then carried out.

In step S403, the degree of opening of the low pressure EGR valve 17 is decreased without placing it into a valve closed state. At this time, a decreased amount of the degree of opening of the low pressure EGR valve 17 is set based on the amount of low pressure EGR gas to be required.

Then, in step S404, the high pressure EGR valve 13 is closed. Thereafter, the execution of this flow is once ended.

Here, note that in this embodiment, there is no need to necessarily place the high pressure EGR valve 13 into the fully closed state. By decreasing the degree of opening of the high pressure EGR valve 13 at the time when the ammonia derived compound is added from the ammonia derived compound addition valve 25, it is possible to decrease the flow rate of the EGR gas flowing through the high pressure EGR passage 12 in comparison with the case when the ammonia derived compound is not added. As a result of this, it is possible to suppress the inflow of the ammonia derived compound to the high pressure EGR passage 12.

In this embodiment, the ECU 20, which carries out the processing of step S102, S403 and S404 in the above-mentioned flow, corresponds to the controller according to the present invention.

Further, in this embodiment, too, similar to the first embodiment, the flow rate of the EGR gas flowing through the low pressure EGR passage 16 may be decreased by controlling the second throttle valve 19, the exhaust throttle valve, etc., in place of or in addition to controlling the low pressure EGR valve 17, at the time when the ammonia derived compound is added from the ammonia derived compound addition valve 25. In addition, similar to the second embodiment, the flow rate of the EGR gas flowing through the high pressure EGR passage 12 may be decreased by controlling the first throttle valve 9, etc., in place of or in addition to controlling the high pressure EGR valve 13, at the time when the ammonia derived compound is added from the ammonia derived compound addition valve 25.

<Fifth Embodiment>

Figure 14:
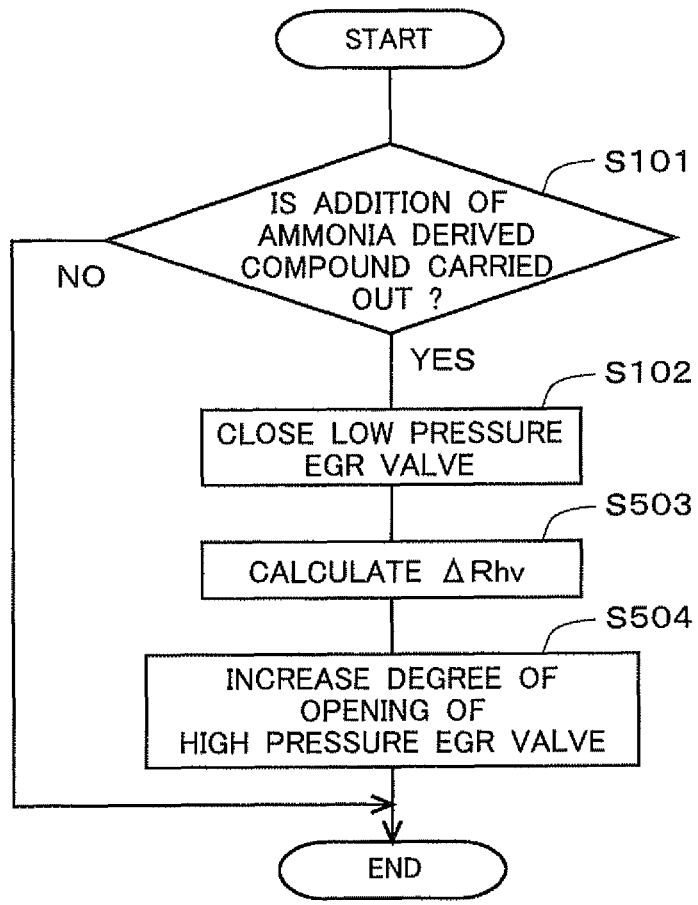
[FIG. 14] is a flow chart showing a control flow for a low pressure EGR valve and a high pressure EGR valve according to a fifth embodiment of the present invention.

Reference will be made to a fifth embodiment of the present invention based on FIG. 14. Here, note that only those which are different from the first embodiment will be explained.

(Control of EGR Valves)

In this embodiment, similar to the first embodiment, at the time when the ammonia derived compound is added from the ammonia derived compound addition valve 25, the low pressure EGR valve 17 is closed, so that the circulation of the EGR gas in the low pressure EGR passage 16 is stopped. At this time, the flow rate of the EGR gas flowing through the high pressure EGR passage 12 is made to increase by causing the degree of opening of the high pressure EGR valve 13 to increase. In other words, the amount of introduction of the high pressure EGR gas to the intake passage 4 is made to increase. As a result of this, it is possible to suppress a decrease in the amount of supply of the EGR gas to the internal combustion engine 1, following the introduction of the low pressure EGR gas into the intake passage 4 being stopped.

(Control Flow)

A control flow for the low pressure EGR valve and the high pressure EGR valve according to this embodiment will be described based on a flow chart shown in FIG. 14. This flow has been beforehand stored in the ECU 20, and is carried out in a repeated manner by the ECU 20 during the operation of the internal combustion engine 1. Here, note that in this flow, steps S503 and S504 are added to the flow shown in FIG. 2. Therefore, only processing in steps S503 through S504 will be explained.

In this flow, the processing of step S503 is carried out after the processing of step S102. In step S503, an increased amount $\Delta Rhv$ of the degree of opening of the high pressure EGR valve 13 is calculated. The increased amount $\Delta Rhv$ of the degree of opening of the high pressure EGR valve 13 is calculated as a value that makes it possible to increase the amount of high pressure EGR gas by an amount of low pressure EGR gas which is before the low pressure EGR valve 17 is closed. In this embodiment, the relation between the increased amount $\Delta Rhv$ of the degree of opening of the high pressure EGR valve 13 and the amount of low pressure EGR gas before the low pressure EGR valve 17 is closed has been beforehand stored in the ECU 20 as a map. In step S503, the increased amount $\Delta Rhv$ of the degree of opening of the high pressure EGR valve 13 is calculated by the use of this map.

Here, note that even if the degree of opening of the high pressure EGR valve 13 is increased to an upper limit value, it may be difficult to increase the amount of high pressure EGR gas by the amount of low pressure EGR gas before the low pressure EGR valve 17 is closed. In this case, the increased amount of the degree of opening of the high pressure EGR valve 13 may also be set to a value at which the degree of opening of the high pressure EGR valve 13 becomes the upper limit value.

Subsequently, in step S504, the degree of opening of the high pressure EGR valve 13 is increased by the increased amount $\Delta Rhv$ which has been calculated in step S503. Thereafter, the execution of this flow is once ended.

Here, note that in this embodiment, too, at the time when the amount of addition of the ammonia derived compound from the ammonia derived compound addition valve 25 is decreased, there is no need to necessarily place the low pressure EGR valve 17 into a fully closed state. Even in this case, if the degree of opening of the low pressure EGR valve 17 is decreased, the amount of low pressure EGR gas will decrease. Accordingly, the degree of opening of the high pressure EGR valve 13 is made to increase in order to compensate an amount of decrease in the amount of low pressure EGR gas, similarly as described above.

Here, note that in this embodiment, the ECU 20, which carries out the processing of steps S102 and S504 in the above-mentioned flow, corresponds to the controller according to the present invention.

In addition, in this embodiment, the flow rate of the EGR gas flowing through the high pressure EGR passage 12 may be increased by carrying out other control, instead of increasing the degree of opening of the high pressure EGR valve 13, at the time when the ammonia derived compound is added from the ammonia derived compound addition valve 25. For example, by decreasing the degree of opening of the first throttle valve 9, too, it is possible to increase the flow rate of the EGR gas flowing through the high pressure EGR passage 12. In addition, in this embodiment, too, similar to the first embodiment, the flow rate of the EGR gas flowing through the low pressure EGR passage 16 may be decreased by controlling the second throttle valve 19, the exhaust throttle valve, etc., in place of or in addition to controlling the low pressure EGR valve 17, at the time when the ammonia derived compound is added from the ammonia derived compound addition valve 25.

<Sixth Embodiment>

Figure 15:
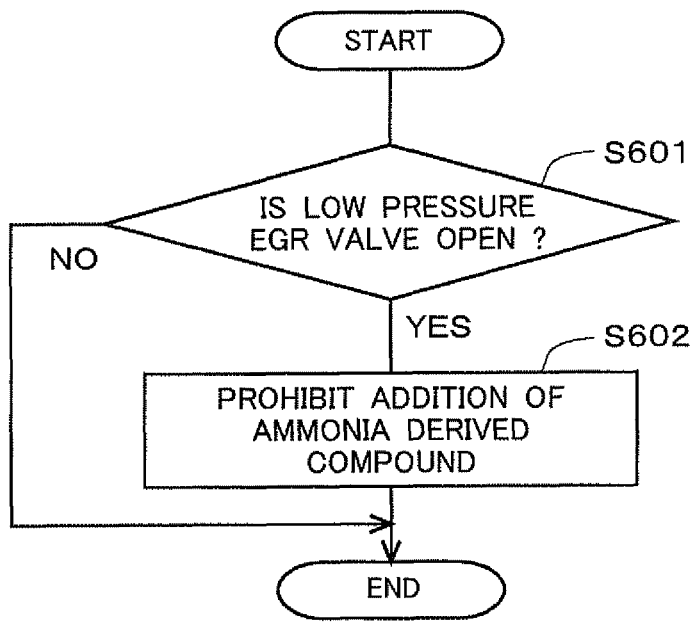
[FIG. 15] is a flow chart showing a control flow for an ammonia derived compound addition valve according to a sixth embodiment of the present invention.

Reference will be made to a sixth embodiment of the present invention based on FIG. 15. Here, note that only those which are different from the first embodiment will be explained.

(Ammonia Derived Compound Addition Control)

In this embodiment, at the time when the introduction of the low pressure EGR gas into the intake passage 4 is carried out by opening the low pressure EGR valve 17, the addition of the ammonia derived compound from the ammonia derived compound addition valve 25 is prohibited. According to this, too, as in the first embodiment, the inflow of the ammonia derived compound into the low pressure EGR passage 16 can be suppressed.

In this embodiment, when the low pressure EGR valve 17 is in the fully closed state and the ammonia derived compound is added from the ammonia derived compound addition valve 25, in cases where an execution condition for the introduction of the low pressure EGR gas into the intake passage 4 is satisfied, the addition of the ammonia derived compound from the ammonia derived compound addition valve 25 is stopped, and thereafter, the low pressure EGR valve 17 is opened. In addition, during the time when the low pressure EGR valve 17 is in an open state so that the introduction of the low pressure EGR gas into the intake passage 4 is carried out, when it comes to the time to execute the addition of the ammonia derived compound from the ammonia derived compound addition valve 25, the addition of the ammonia derived compound is prohibited until the introduction of the low pressure EGR gas into the intake passage 4 is stopped.

Here, note that in this embodiment, when the internal combustion engine 1 is in an ordinary operating state and the NOx selective reduction catalyst 25 is in an active state, the addition of the ammonia derived compound from the ammonia derived compound addition valve 25 may always be carried out.

(Control Flow)

A control flow for the ammonia derived compound addition valve according to this embodiment will be described based on a flow chart shown in FIG. 15. This flow has been beforehand stored in the ECU 20, and is carried out in a repeated manner by the ECU 20 during the operation of the internal combustion engine 1.

In this flow, first in step S601, it is determined whether the low pressure EGR valve 17 has been opened, i.e., whether the introduction of the low pressure EGR gas into the intake passage 4 has been carried out. In step S601, in cases where an affirmative determination is made, the processing of step S602 is then carried out, whereas in cases where a negative determination is made, the execution of this flow is once ended.

In step S602, the addition of the ammonia derived compound from the ammonia derived compound addition valve 25 is prohibited. Thereafter, the execution of this flow is once ended.

In this embodiment, by prohibiting the addition of the ammonia derived compound from the ammonia derived compound addition valve 25 at the time when the introduction of the low pressure EGR gas into the intake passage 4 is carried out, the inflow of the ammonia derived compound into the low pressure EGR passage 16 and the intake passage 4 can be suppressed in a reliable manner. However, there is no need to necessarily prohibit the addition of the ammonia derived compound from the ammonia derived compound addition valve 25. That is, if the amount of addition of the ammonia derived compound is made smaller than that at the time when the introduction of the low pressure EGR gas into the intake passage 4 is not carried out (i.e., when the low pressure EGR valve 17 is in the fully closed state), it will be possible to suppress the inflow of the ammonia derived compound into the low pressure EGR passage 16 and the intake passage 4.

Here, note that in this embodiment, the ECU 20, which carries out the processing of step S602 in the above-mentioned flow, corresponds to the controller according to the present invention.

Moreover, even in the constructions as in the respective modifications of the first embodiment, the same effects as those stated above can be obtained by controlling the ammonia derived compound addition valve 25 in the same manner as described above.

<Seventh Embodiment>

Figure 16:
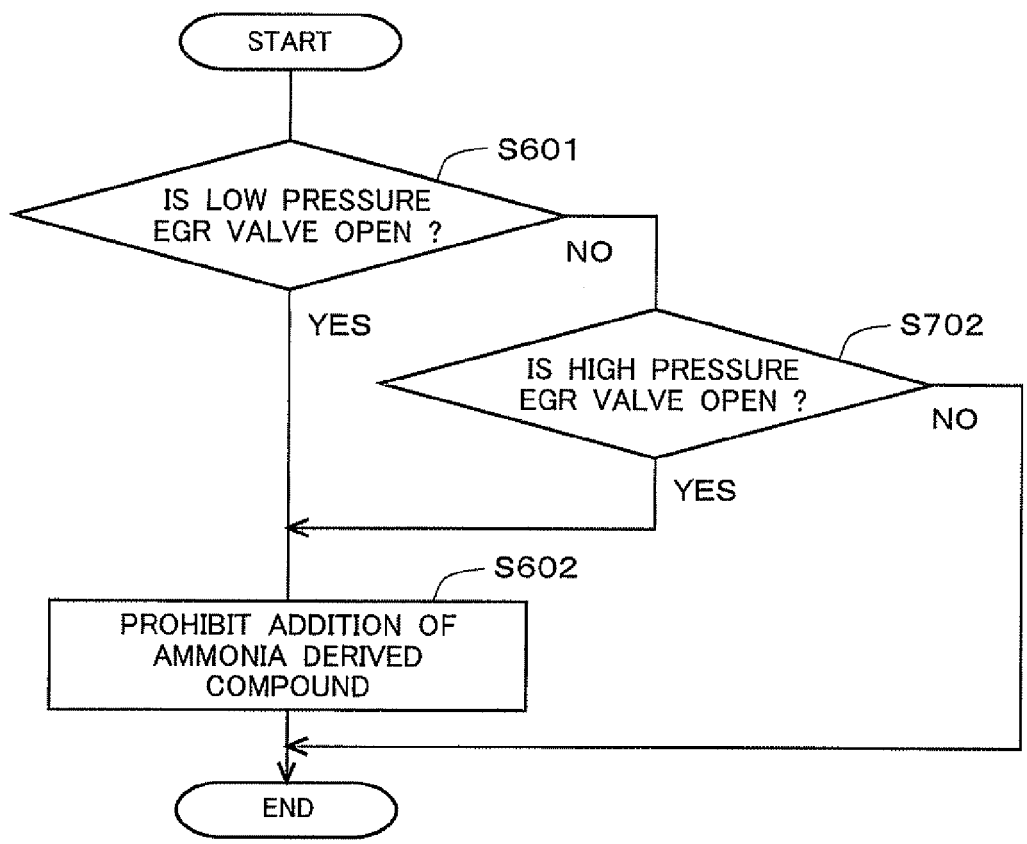
[FIG. 16] is a flow chart showing a control flow for an ammonia derived compound addition valve according to a seventh embodiment of the present invention.

Reference will be made to a seventh embodiment of the present invention based on FIG. 16. Here, note that only those which are different from the sixth embodiment will be explained.

(Schematic Construction of Internal Combustion Engine and Intake and Exhaust Systems)

The schematic construction of an internal combustion engine and its air intake and exhaust system according to this seventh embodiment is the same as the construction thereof according to the second embodiment.

(Ammonia Derived Compound Addition Control)

In this embodiment, not only when the introduction of the low pressure EGR gas into the intake passage 4 is carried out, but also when the introduction of the high pressure EGR gas into the intake passage 4 is carried out by opening the high pressure EGR valve 13, the addition of the ammonia derived compound from the ammonia derived compound addition valve 25 is prohibited. According to this, too, as in the second embodiment, the inflow of the ammonia derived compound into the low pressure EGR passage 16 and the high pressure EGR passage 12 can be suppressed.

Here, note that in this embodiment, when the high pressure EGR valve 13 is in the fully closed state and the ammonia derived compound is added from the ammonia derived compound addition valve 25, in cases where an execution condition for the introduction of the high pressure EGR gas into the intake passage 4 is satisfied, the addition of the ammonia derived compound from the ammonia derived compound addition valve 25 is stopped, and thereafter, the high pressure EGR valve 13 is opened. In addition, during the time when the high pressure EGR valve 13 is in an open state so that the introduction of the high pressure EGR gas into the intake passage 4 is carried out, when it comes to the time to execute the addition of the ammonia derived compound from the ammonia derived compound addition valve 25, the addition of the ammonia derived compound is prohibited until the introduction of the high pressure EGR gas into the intake passage 4 is stopped.

(Control Flow)

A control flow for the ammonia derived compound addition valve according to this embodiment will be described based on a flow chart shown in FIG. 16. This flow has been beforehand stored in the ECU 20, and is carried out in a repeated manner by the ECU 20 during the operation of the internal combustion engine 1. Here, note that in this flow, a step S702 is added to the flow shown in FIG. 15. Therefore, only processing in step S702 will be explained.

In this flow, in cases where a negative determination is made in step S601, the processing of step S702 is then carried out. In step S702, it is determined whether the high pressure EGR valve 13 has been opened, i.e., whether the introduction of the high pressure EGR gas into the intake passage 4 has been carried out. In step S702, in cases where an affirmative determination is made, the processing of step S602 is then carried out, whereas in cases where a negative determination is made, the execution of this flow is once ended.

Here, note that in this embodiment, too, the ECU 20, which carries out the processing of step S602 in the above-mentioned flow, corresponds to the controller according to the present invention.

Further, in this embodiment, too, similar to the sixth embodiment, there is no need to necessarily prohibit the addition of the ammonia derived compound from the ammonia derived compound addition valve 25. That is, if the amount of addition of the ammonia derived compound is made smaller than that at the time when the introduction of the high pressure EGR gas into the intake passage 4 is not carried out (i.e., when the high pressure EGR valve 13 is in the fully closed state), it will be possible to suppress the inflow of the ammonia derived compound into the high pressure EGR passage 12 and the intake passage 4.

<Eighth Embodiment>

Figure 17:
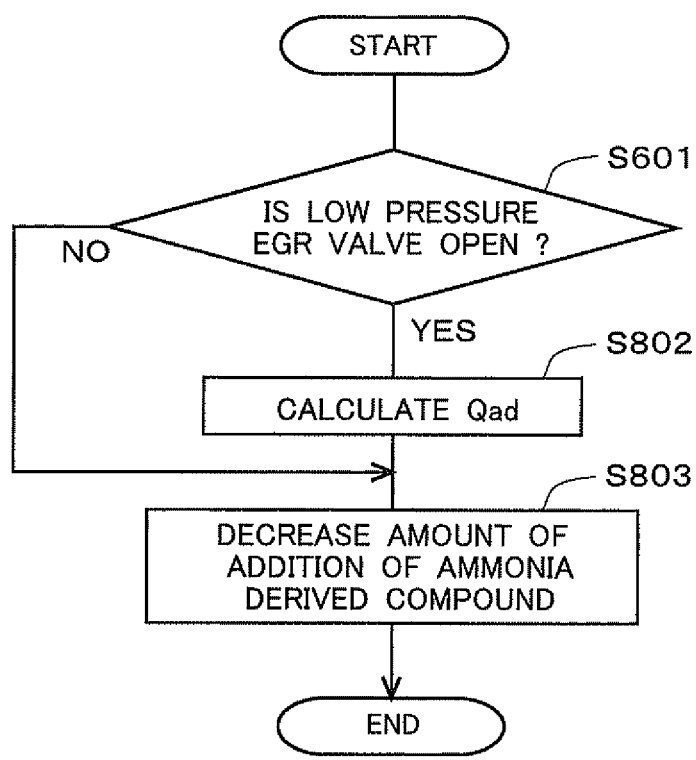
[FIG. 17] is a flow chart showing a control flow for an ammonia derived compound addition valve according to an eighth embodiment of the present invention.

Reference will be made to an eighth embodiment of the present invention based on. FIG. 17. Here, note that only those which are different from the sixth embodiment will be explained.

(Schematic Construction of Internal Combustion Engine and Intake and Exhaust Systems)

The schematic construction of an internal combustion engine and its air intake and exhaust system according to this eighth embodiment is the same as the construction thereof according to the third embodiment.

(Ammonia Derived Compound Addition Control)

In this embodiment, too, at the time when the introduction of the low pressure EGR gas into the intake passage 4 is carried out by opening the low pressure EGR valve 17, the amount of addition of the ammonia derived compound from the ammonia derived compound addition valve 25 is made smaller in comparison with the case when the introduction of the low pressure EGR gas its not carried out, Here, as stated above, the outflow amount of the ammonia derived compound flowing out of the NOx selective reduction catalyst 26 changes according to the temperature of the NOx selective reduction catalyst 26, the flow rate of the exhaust gas, etc. Accordingly, in this embodiment, at the time when the amount of addition of the ammonia derived compound from the ammonia derived compound addition valve 25 is decreased, the amount of addition of the ammonia derived compound is made larger in cases where the amount of the ammonia derived compound flowing out to the downstream side of the NOx selective reduction catalyst 26 is small, in comparison with the case where the amount of addition thereof is large. According to this, a decrease in the amount of the ammonia derived compound supplied to the NOx selective reduction catalyst 26 can be suppressed as much as possible, while suppressing the inflow of the ammonia derived compound into the low pressure EGR passage 16.

(Control Flow)

A control flow for the ammonia derived compound addition valve according to this embodiment will be described based on a flow chart shown in FIG. 17. This flow has been beforehand stored in the ECU 20, and is carried out in a repeated manner by the ECU 20 during the operation of the internal combustion engine 1. Here, note that this flow is such that the step S602 in the flow chart shown in FIG. 15 is replaced by steps S802 and S803. Therefore, only processing in steps S802 and S803 will be explained.

In this flow, in cases where an affirmative determination is made in step S601, the processing of step S802 is then carried out. In step S802, there is calculated an amount of addition (hereinafter referred to as an outflow upper limit amount of addition) Qad of the ammonia derived compound in which the outflow amount of the ammonia derived compound flowing out of the NOx selective reduction catalyst 26 at the time when the ammonia derived compound is added from the ammonia derived compound addition valve 25 becomes an upper limit value of an allowable range.

In this embodiment, a map showing the relation among the outflow upper limit amount of addition Qad, the temperature of the NOx selective reduction catalyst 26 and the flow rate of the exhaust gas has been beforehand stored in the ECU 20. In this map, the lower the temperature of the NOx selective reduction catalyst 26, and the smaller the flow rate of the exhaust gas, the larger becomes the outflow upper limit amount of addition Qad. In step S802, the outflow upper limit amount of addition Qad is calculated using this map.

Subsequently, in step S803, the amount of addition of the ammonia derived compound from the ammonia derived compound addition valve 25 is decreased to the outflow upper limit amount of addition Qad which has been calculated in step S802. Thereafter, the execution of this flow is once ended.

Here, note that in this embodiment, the ECU 20, which carries out the processing of step S803 in the above-mentioned flow, corresponds to the controller according to the present invention.

The above-mentioned respective embodiments can be combined with one another wherever possible.

[Description of the Reference Signs]

1 . . . internal combustion engine
4 . . . intake passage
5 . . . intake manifold
6 . . . exhaust passage
7 . . . exhaust manifold
8 . . . turbocharger
8a . . . compressor
8b . . . turbine
9 . . . first throttle valve
10 . . . particulate filter
11 . . . high pressure EGR device
12 . . . high pressure EGR passage
13 . . . high pressure EGR valve
14 . . . high pressure EGR cooler
15 . . . low pressure EGR device
16 . . . low pressure EGR passage
17 . . . low pressure EGR valve
18 . . . low pressure EGR cooler
19 . . . second throttle valve
20 . . . ECU
23 . . . oxidation catalyst
24 . . . particulate filter
25 . . . ammonia derived compound addition valve
26 . . . NOx selective reduction catalyst
27 . . . temperature sensor
28 . . . NOx sensor

The invention claimed is:

1. A control system for an internal combustion engine, the control system comprising:

an EGR system that has an EGR passage connected at its one end to an exhaust system of the internal combustion engine, and at its other end to an intake system of the internal combustion engine, and that introduces a part of an exhaust gas flowing through the exhaust system into the intake system through the EGR passage as an EGR gas;

an NOx selective reduction catalyst that is arranged in the exhaust system;

an ammonia derived compound addition device configured to add an ammonia derived compound, which is a reducing agent, into the exhaust gas, and arranged in the exhaust system at an upstream side of the NOx selective reduction catalyst in such a position as to enable at least a part of the ammonia derived compound thus added to arrive at a connection portion of the EGR passage; and at least one controller configured to suppress an inflow of the ammonia derived compound added by the ammonia derived compound addition device into the EGR passage, the controller further configured to suppress the inflow of the ammonia derived compound added by the ammonia derived compound addition device into the EGR passage by decreasing a flow rate of the EGR gas flowing through the EGR passage at a time when the ammonia derived compound is added by the ammonia derived compound addition device, in comparison with a case when the ammonia derived compound is not added by the ammonia derived compound addition device.

2. The control system as set forth in claim 1, wherein the EGR passage has the one end thereof connected to a portion of the exhaust system at a downstream side of the NOx selective reduction catalyst; and at the time of decreasing the flow rate of the EGR gas flowing through the EGR passage, the controller makes the flow rate of the EGR gas larger in cases where an amount of the ammonia derived compound flowing out to the downstream side of the NOx selective reduction catalyst without being used for the reduction of NOx in the NOx selective reduction catalyst is small, in comparison with a case where the amount of the ammonia derived compound flowing out to the downstream side of the NOx selective reduction catalyst without being used for the reduction of NOx in the NOx selective reduction catalyst is large.

3. The control system as set forth in claim 1, wherein the EGR passage is a low pressure EGR passage that has the one end thereof connected to a portion of the exhaust system at a downstream side of a turbine of a turbocharger, and the other end thereof connected to a portion of the intake system at an upstream side of a compressor of the turbocharger;

the EGR device further includes a high pressure EGR passage that has one end thereof connected to a portion of the exhaust system at an upstream side of the turbine of the turbocharger, and the other end thereof connected to a portion of the intake system at a downstream side of the compressor of the turbocharger; and at the time of decreasing the flow rate of the EGR gas flowing through the low pressure EGR passage when the ammonia derived compound is added by the ammonia derived compound addition device, the controller decreases the flow rate of the EGR gas flowing through the high pressure EGR passage in cases where the circulation of the EGR gas in the low pressure EGR passage is not stopped.

4. The control system as set forth in claim 1, wherein the EGR passage is a low pressure EGR passage that has the one end thereof connected to a portion of the exhaust system at a downstream side of a turbine of a turbocharger, and the other end thereof connected to a portion of the intake system at an upstream side of a compressor of the turbocharger;

the EGR device further includes a high pressure EGR passage that has one end thereof connected to a portion of the exhaust system at an upstream side of the turbine of the turbocharger, and the other end thereof connected to a portion of the intake system at a downstream side of the compressor of the turbocharger; and the controller increases the flow rate of the EGR gas flowing through the high pressure EGR passage at the time of decreasing the flow rate of the EGR gas flowing through the low pressure EGR passage when the ammonia derived compound is added by the ammonia derived compound addition device.

5. The control system as set forth in claim 1, wherein the EGR passage is a low pressure EGR passage that has the one end thereof connected to a portion of the exhaust system at a downstream side of a turbine of a turbocharger, and the other end thereof connected to a portion of the intake system at an upstream side of a compressor of the turbocharger.

6. The control system as set forth in claim 1, wherein the EGR passage is a high pressure EGR passage that has the one end thereof connected to a portion of the exhaust system at an upstream side of a turbine of a turbocharger, and the other end thereof connected to a portion of the intake system at a downstream side of a compressor of the turbocharger.

7. A control system for an internal combustion engine, the control system comprising:

an EGR system that has an EGR passage connected at its one end to an exhaust system of the internal combustion engine, and at its other end to an intake system of the internal combustion engine, and that introduces a part of an exhaust gas flowing through the exhaust system into the intake system through the EGR passage as an EGR gas;

an NOx selective reduction catalyst that is arranged in the exhaust system;

an ammonia derived compound addition device configured to add an ammonia derived compound, which is a reducing agent, into the exhaust gas, and arranged in the exhaust system at an upstream side of the NOx selective reduction catalyst in such a position as to enable at least a part of the ammonia derived compound thus added to arrive at a connection portion of the EGR passage; and at least one controller configured to suppress an inflow of the ammonia derived compound added by the ammonia derived compound addition device into the EGR passage, the controller further configured to suppress the inflow of the ammonia derived compound added by the ammonia derived compound addition device into the EGR passage at a time when the EGR gas is introduced into the intake system by way of the EGR passage, by making an amount of addition of the ammonia derived compound by the ammonia derived compound addition device smaller in comparison with a case when the introduction of the EGR gas into the intake system is stopped.

8. The control system as set forth in claim 7, wherein the EGR passage has the one end thereof connected to a portion of the exhaust system at a downstream side of the NOx selective reduction catalyst; and at the time of making the amount of addition of the ammonia derived compound from the ammonia derived compound addition device smaller, the controller makes the amount of addition of the ammonia derived compound larger in cases where the amount of the ammonia derived compound flowing out to the downstream side of the NOx selective reduction catalyst without being used for the reduction of NOx in the NOx selective reduction catalyst is small, in comparison with a case where the amount of the ammonia derived compound flowing out to the downstream side of the NOx selective reduction catalyst without being used for the reduction of NOx in the NOx selective reduction catalyst is large.

9. The control system as set forth in claim 7, wherein the EGR passage is a low pressure EGR passage that has the one end thereof connected to a portion of the exhaust system at a downstream side of a turbine of a turbocharger, and the other end thereof connected to a portion of the intake system at an upstream side of a compressor of the turbocharger.

10. The control system as set forth in claim 7, wherein the EGR passage is a high pressure EGR passage that has the one end thereof connected to a portion of the exhaust system at an upstream side of a turbine of a turbocharger, and the other end thereof connected to a portion of the intake system at a downstream side of a compressor of the turbocharger.

* * * * *